(12) United States Patent
Takaku

(10) Patent No.: US 7,408,954 B2
(45) Date of Patent: Aug. 5, 2008

(54) COMMUNICATION METHOD FOR TRANSMITTING STREAMING DATA

(75) Inventor: Yoshiyuki Takaku, Tokyo (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 10/432,941

(22) PCT Filed: Sep. 20, 2002

(86) PCT No.: PCT/JP02/09729

§ 371 (c)(1),
(2), (4) Date: May 27, 2003

(87) PCT Pub. No.: WO03/030457

PCT Pub. Date: Apr. 10, 2003

(65) Prior Publication Data

US 2004/0042451 A1    Mar. 4, 2004

(30) Foreign Application Priority Data

Sep. 27, 2001    (JP) ............................. 2001-297969

(51) Int. Cl.
*H04L 12/50* (2006.01)
*H04Q 11/00* (2006.01)
*H04J 3/06* (2006.01)

(52) U.S. Cl. ...................................... 370/466; 370/503
(58) Field of Classification Search ................. 370/300, 370/389; 379/68
See application file for complete search history.

(56) References Cited

U.S. PATENT DOCUMENTS

| | | | | |
|---|---|---|---|---|
| 5,271,011 A | * | 12/1993 | McMullan et al. | .......... 714/807 |
| 5,712,976 A | * | 1/1998 | Falcon et al. | ................. 725/115 |
| 6,292,846 B1 | * | 9/2001 | Hara et al. | ...................... 710/5 |
| 6,385,212 B1 | * | 5/2002 | Baba et al. | ................... 370/506 |
| 6,463,486 B1 | * | 10/2002 | Parry et al. | .................... 710/52 |
| 6,550,057 B1 | * | 4/2003 | Bowman-Amuah | ......... 717/126 |
| 2001/0028655 A1 | | 10/2001 | Noda et al. | |

FOREIGN PATENT DOCUMENTS

| | | |
|---|---|---|
| CN | 1290006 A | 4/2001 |
| EP | 1087557 A2 | 3/2001 |
| JP | 2001-094448 A | 4/2001 |
| JP | 2001-237860 A | 8/2001 |
| JP | 2001-250318 A | 9/2001 |
| KR | 2001050588 A | 6/2001 |

* cited by examiner

*Primary Examiner*—Seema S. Rao
*Assistant Examiner*—Jianye Wu
(74) *Attorney, Agent, or Firm*—Wolf, Greenfield & Sacks, P.C.

(57) ABSTRACT

In order to prevent interruption of processing at the time when the format of data changes during transmission of streaming data over an IEEE 1394 or other network, when streaming data output from first equipment is caused to be received by second equipment via a prescribed network, when the streaming data output from the first equipment changes from content A in a first format to content B in a second format, after the end of output of content B invalid data in the same format as content B is output, and during output of this invalid data the first equipment investigates the state of the second equipment (steps S11 to S14); when it is detected that preparations for input of streaming data in the second format are completed, output of content B in the second format is begun.

17 Claims, 15 Drawing Sheets

FIG. 11

Command Types/Responses

| | | |
|---|---|---|
| Command | 0000 | Control |
| | 0001 | Status |
| | 0010 | Specific Inquiry |
| | 0011 | Notify |
| | 0100 | General Inquiry |
| | 0101 ~ 0111 | (Undefined) |
| Response | 1000 | Not Implemented |
| | 1001 | Accepted |
| | 1010 | Rejected |
| | 1011 | Changing |
| | 1100 | Implemented/Stable |
| | 1101 | State Change |
| | 1110 | (Undefined) |
| | 1111 | Tentative |

Subunit Types

| | |
|---|---|
| 00000 ~ 00011 | Video Monitor Disc Recorder/Player |
| 00100 | Tape Recorder/Player |
| 00101 | Tuner |
| 00111 | Video Camera |
| 01010 | BBS |
| 11100 | Value Specific to Manufacturer |
| 11101 | Undefined |
| 11110 | (Specific Subunit Type) |
| 11111 | Unit |

Opcodes: Operation Codes

| | |
|---|---|
| 00h | Value Specific to Manufacturer |
| 50h | Search Mode |
| 51h | Time Code |
| 52h | ATN |
| 60h | Memory Open |
| 61h | Memory Read |
| 62h | Memory Write |
| C1h | Load |
| C2h | Record |
| C3h | Reproduce |
| C4h | Rewind |
| ~ | ~ |

FIG. 14

| | Data Length | ck | msb | Input Plug Signal Format ($19_{16}$) | lsb |
|---|---|---|---|---|---|
| Opcode | 1 | ✓ | | | |
| Operand [0] | 1 | ✓ | | Plug | |
| Operand [1] | | | | | |
| ... | 4 | ✓ | | All $FF_{16}$ | |
| Operand [4] | | | | | |

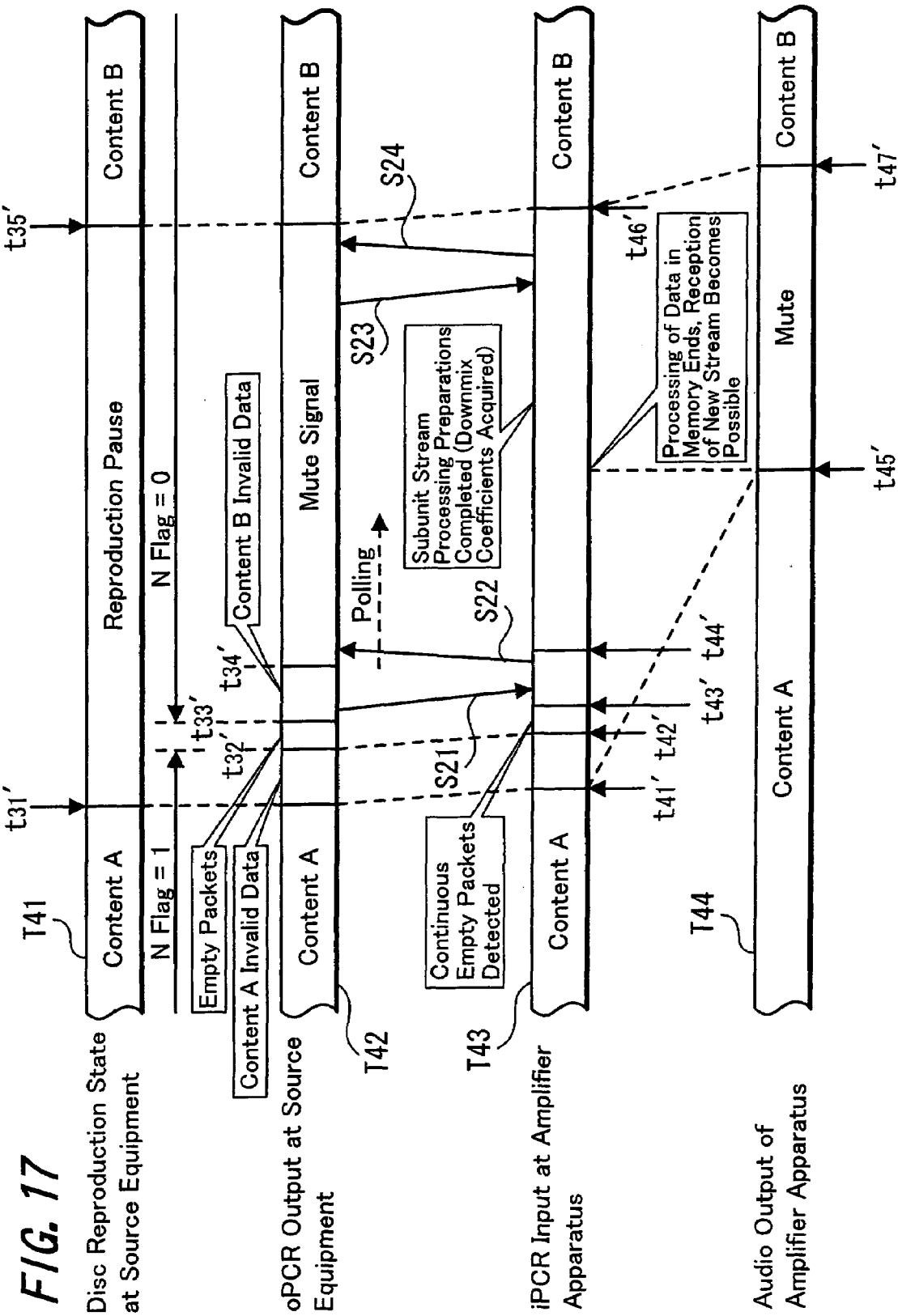

COMMUNICATION METHOD FOR TRANSMITTING STREAMING DATA

TECHNICAL FIELD

This invention relates to a communication method and communication system suitable for application when transmitting audio data and other streaming data between equipment connected by, for example, an IEEE (Institute of Electrical and Electronics Engineers) 1394 bus line, as well as to output equipment used by this communication system.

BACKGROUND ART

Audio and video equipment is being developed which is capable of bidirectional transmission of information via networks using an IEEE 1394 serial data bus. When transmitting data over such a bus, an isochronous transfer mode, used for realtime transmission of comparatively large quantities of video data, audio data and similar, and an asynchronous transfer mode, used for reliable transmission of still images, text data, control commands and similar, are provided, and dedicated frequency bands are used for each of these modes in transmission.

FIG. 1 is a diagram showing an example of connections using such an IEEE 1394 bus; source equipment a, which is equipment sending data, input equipment (sink equipment) b, which is equipment receiving data sent from the source equipment a, and a controller c which controls data transmission between the equipment a and b, are connected by an IEEE 1394 bus d. At this time, when for example audio data is to be transmitted between the equipment a and b under control of the controller c, the controller c secures an isochronous transfer channel on the bus d, and after establishing a connection between the equipment a and b to enable transmission over this channel, causes transmission from the source equipment a to the input equipment b to be initiated. The source equipment a or the input equipment b may also serve as the controller.

When transmitting data between the source equipment a and input equipment b in this way, a transmission method, in which control commands in what is called an "AV/C command transaction set" are used, is applied to, for example, audio and video equipment. The details of the AV/C command set are described in the "AV/C Digital Interface Command Set General Specification," published by the 1394 Trade Association.

When transmitting audio data or other streaming data from source equipment to input equipment, processing must be performed by the input equipment according to the type of streaming data transmitted. Hence when there are changes in the format or other parameters of the streaming data during transmission, this must be detected by the input data, and switching processing must be performed to change the processing state.

FIG. 2 is a diagram showing one example in which the data format changes during transmission of streaming data via a bus line. Suppose for example that the source equipment a is a disc reproduction apparatus, and that audio data (streaming data) comprising content A and content B is recorded on the disc from which data is being reproduced by the disc reproduction apparatus. Suppose that content A and content B are content recorded as audio data for output as streaming data in different formats. Further, suppose that the input equipment b processes the input audio data for output, and is provided with the functions of an amplifier to output the data to a connected speaker or similar. In such a configuration, streaming data reproduced by the source equipment a from the disc is transmitted to the input equipment b via the bus line.

Suppose that in such transmission, reproduction of content A ends at time ta, and processing proceeds to reproduction of content B. At this time, the input equipment b must change the settings of internal circuitry and similar from the processing state for processing of content A to the processing state for processing of content B, and so the audio of content B is output from the speaker at the time tb at which these preparations are completed.

Hence during the interval from time ta, at which the format changes, until time tb, the audio of content B is not output, and so the problem of loss of the beginning of the content occurs.

Such problems are particularly prominent when what is called rate control (flow control) processing is executed between the source equipment and the input equipment. FIG. 3 is a diagram showing a state in which rate control is performed. This rate control is flow control processing to adjust the rate at which streaming data is output from the source equipment a, in keeping with the rate of processing of the streaming data by the input equipment b. In this example, the input equipment b comprises a buffer memory m which temporarily accumulates transmitted streaming data; the input equipment b sends rate control data to the source equipment a such that the amount of data accumulated in this memory m is substantially constant, and the source equipment a controls the output rate based on this rate control data when sending streaming data to the input equipment b.

In this case, when the format of the input data changes, if the buffer memory m does not output all the data accumulated in the memory to temporarily empty the buffer, data in another format cannot be accumulated. For this reason, when there is a change in format from content A to content B as shown in the above-mentioned FIG. 2, data accumulated in the memory m at time ta at which the format of the transmitted data changes must all be output before the content B can be input. Hence when control such as rate control is being executed, there is the problem that a comparatively long time is necessary before the changed format can be accommodated (that is, the time interval from time ta to time tb in FIG. 3).

The explanation thus far has described problems for the case of transmission of streaming data over a network connected by an IEEE 1394 bus line; but when transmitting streaming data over other networks, similar problems occur if the format of the streaming data changes.

DISCLOSURE OF THE INVENTION

This invention has as an object prevention of the interruption of processing, when streaming data is transmitted over an IEEE 1394 or other network, at the time when there is a change during transmission in the format of the streaming data.

A first invention is a communication method in which streaming data output from first equipment passes through a prescribed network and is received by second equipment, wherein, when the streaming data output from the first equipment is changed from streaming data in a first format to streaming data in a second format, the end of output of streaming data in the first format is detected, invalid data in the same format as the streaming data of the second format is output, and during output of this invalid data, the first equipment investigates the state of the second equipment, detects that preparations are completed for input of streaming data in the second format, and thereafter initiates output of streaming data in the second format.

By means of this method, when the first equipment detects that settings within the equipment which inputs streaming data via the bus have been switched to enable reception of streaming data in the changed format, output of actual streaming data from the first equipment is begun. At this time, the second equipment guarantees that streaming data in the first format which has already been input is processed normally, and enables detection by the first equipment of the fact that settings within the second equipment have been changed. As a result, processing of streaming data in the first format is ended without interruption in the second equipment, and streaming data in the second format can be processed correctly from the beginning, so that the received audio data or other streaming data can be processed satisfactorily and without omissions.

A second invention is the communication method of the first invention, wherein, in order to investigate the state of the second equipment, the first equipment sends a specific packet to the second equipment over the network, and based on the response to this specific packet, the first equipment confirms the state of the second equipment.

By means of this method, the first equipment can simply and reliably confirm the state of the second equipment.

A third invention is the communication method of the second invention, wherein the specific packet comprises data to query whether or not the current state of the second equipment is a state enabling input of streaming data in the second format, and the specific packet is repeatedly transmitted until a state enabling input of streaming data in the second format is confirmed, based on the response to this packet.

By means of this method, so-called polling processing can be used to confirm the state of the second equipment.

A fourth invention is the communication method of the second invention, wherein the specific packet comprises data to cause notification that the second equipment has changed to a state enabling input of streaming data in the second format, and the fact of a change to a state in which streaming data in the second format can be input is confirmed based on a response to this packet.

By means of this method, simply by sending a packet indicating the relevant notification, the first equipment can confirm the state of the second equipment.

A fifth invention is the communication method of the first invention, wherein the invalid data is data which causes audio output at the second equipment to be muted.

By means of this method, during the interval in which the streaming data format is changing, the audio output at the second equipment can be reliably muted, and output of abnormal noise from connected speakers or similar can be reliably prevented.

A sixth invention is a communication system which causes streaming data output from output equipment to be received by input equipment over a prescribed network, wherein the output equipment comprises output equipment communication means to perform communication over the network; streaming data acquisition means to acquire streaming data output from the output equipment communication means; format detection means, which detects changes in the format of the output streaming data; and, output equipment control means, which controls the output of streaming data from the output equipment communication means, executes control such that invalid data is output from the output equipment communication means in the same format as streaming data in the second format when a change is detected in the output streaming data from a first format to a second format, investigates the state of the input equipment through the output equipment communication means during output of the invalid data, and, when it is detected that preparations for input of streaming data in the second format have been completed, begins output from the output equipment communication means of streaming data in the second format; and wherein the input equipment comprises input equipment communication means to perform communication over the network; format discrimination means to discriminate the format of streaming data received by the input equipment communication means; streaming data processing means to process streaming data received by the input equipment communication means; and, input equipment control means to set the processing of streaming data by the streaming data processing means to processing compatible with the format of data received by the input equipment communication means, based on the discrimination result of the format discrimination means.

By means of this system, when the output equipment detects that settings within the equipment which inputs streaming data via the bus have been changed to enable reception of streaming data in the changed format, the output equipment begins output of actual streaming data, so that the input equipment can correctly process streaming data in the changed format from the beginning, and the received audio or other streaming data can be processed satisfactorily and without omissions.

A seventh invention is the communication system of the sixth invention, wherein, in order to investigate the state of the input equipment, the output equipment control means transmits a specific packet from the output equipment communication means to the input equipment, and, when the output equipment communication means receives response data as a response to the transmitted packet, confirms the state of the input equipment based on the received response data; and, when the input equipment communication means receives the specific packet, the input equipment control means transmits data relating to the settings in the streaming data processing means as response data from the input equipment communication means.

By means of this system, the state of the input equipment can be simply and reliably confirmed.

An eighth invention is the communication system of the seventh invention, wherein the output equipment control means appends data to the specific packet output from the output equipment communication means, querying whether the state of the input equipment enables input of streaming data in the second format; and, the input equipment control means appends, to the response output from the input equipment communication means, data enabling distinction of whether preparations for input of streaming data in the second format are completed.

By means of this system, so-called polling processing is used to enable confirmation of the state of the input equipment.

A ninth invention is the communication system of the sixth invention, wherein the invalid data is data which causes audio output to be muted by the streaming data processing means of the input equipment.

By means of this method, during the interval in which the streaming data format is changing, the audio output at the input equipment can be reliably muted, and output of abnormal noise from connected speakers or similar can be reliably prevented.

A tenth invention is output equipment, which outputs streaming data to input equipment via a prescribed network, and comprising communication means to perform communication over the network; streaming data input means to input streaming data output from the communication means; format detection means to detect changes in the format of streaming data output from the communication means; and, control means which controls the output of streaming data from the communication means, which, when the format detection means detects a change in the format of the output streaming data from a first format to a second format, causes invalid data to be output from the communication means in the same format as the streaming data of the second format, and which, when the completion of preparations for input of streaming data in the second format is detected during output of invalid data, causes the output of streaming data from the communication means in the second format to begin.

By means of this equipment, when the output equipment detects a change in settings within the input equipment so as to enable reception of streaming data in the changed format, the output of actual streaming data from the output equipment is begun, so that the input equipment can correctly process the streaming data in the changed format from the beginning, and the received audio or other streaming data can be processed satisfactorily and without omissions.

An eleventh invention is the output equipment of the tenth invention, wherein the control means, in order to investigate the state of the input equipment, executes control so as to transmit a specific packet from the communication means to the input equipment, and, when a response to the transmitted packet is received by the communication means, discriminates the state of the input equipment from the data contained in the response.

By means of this equipment, the state of the input equipment can be simply and reliably confirmed.

A twelfth invention is the output equipment of the eleventh invention, wherein the control means appends, to the specific packet output from the communication means, query data which queries whether the state of the input equipment is such that streaming data in the second format can be input, and executes control such that the specific packet is repeatedly transmitted until it is confirmed, based on a response to a packet to which query data is appended, that the input equipment is in a state in which streaming data in the second format can be input.

By means of this equipment, so-called polling processing is used to enable confirmation of the state of the input equipment.

A thirteenth invention is the output equipment of the tenth invention, wherein the invalid data output from the communication means is data which causes audio output to be muted at the input equipment.

By means of this equipment, during the interval in which the streaming data format is changing, the audio output at the input equipment can be reliably muted, and output of abnormal noise from connected speakers or similar can be reliably prevented.

BRIEF DESCRIPTION OF DRAWINGS

FIG. 11 is an explanatory drawing showing an example of an AV/C command and response;

FIG. 14 is an explanatory drawing showing an example of data in an AV/C input signal format status command;

BEST MODE FOR CARRYING OUT THE INVENTION

Below, one aspect of this invention is explained, referring to FIG. 4 through FIG. 17.

Figure 1:
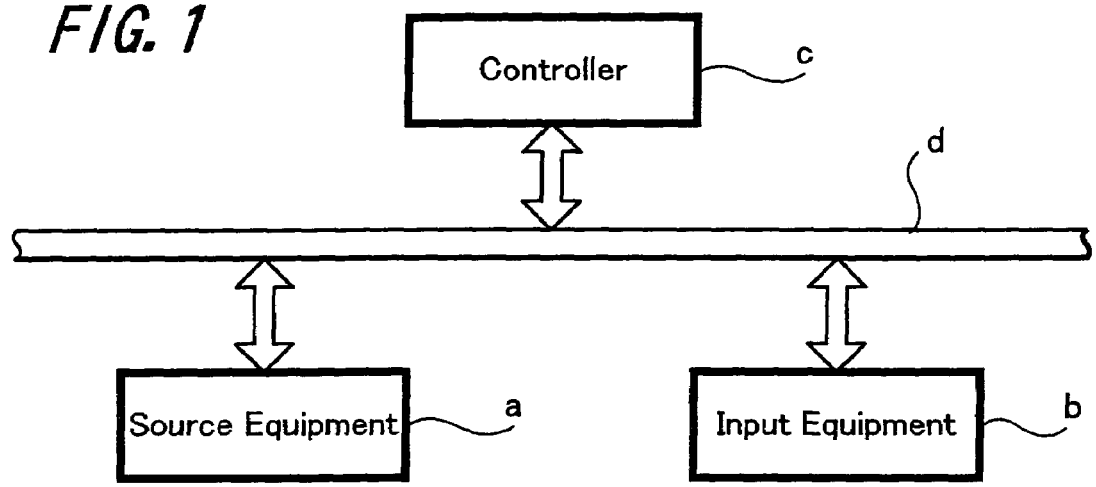
FIG. 1 is a configuration diagram showing an example of connections using an IEEE 1394 bus.
Figure 2:
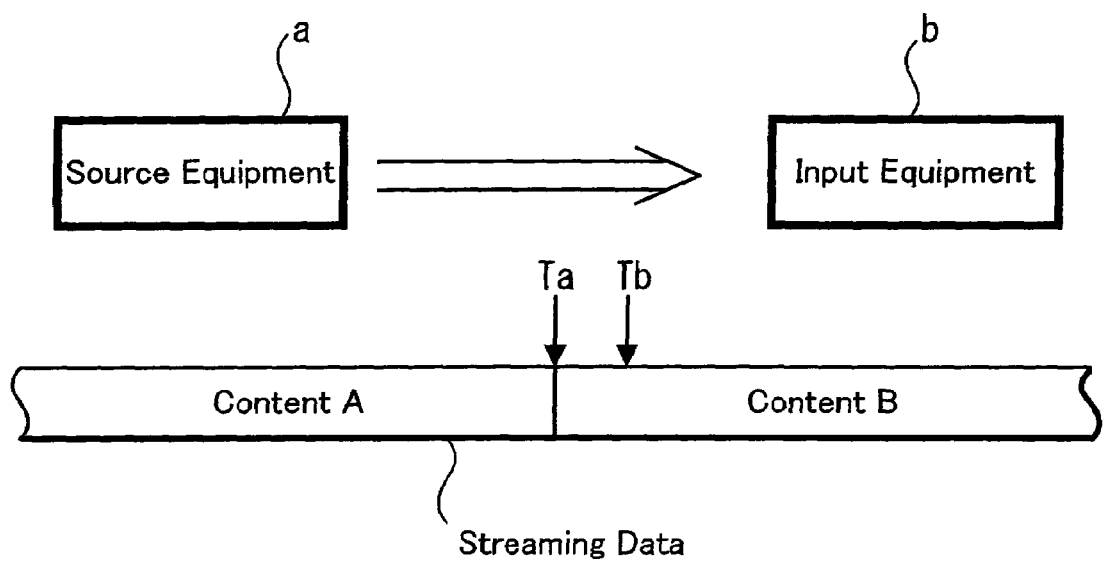
FIG. 2 is an explanatory drawing showing an example of a conventional case in which the format of streaming data changes.
Figure 3:
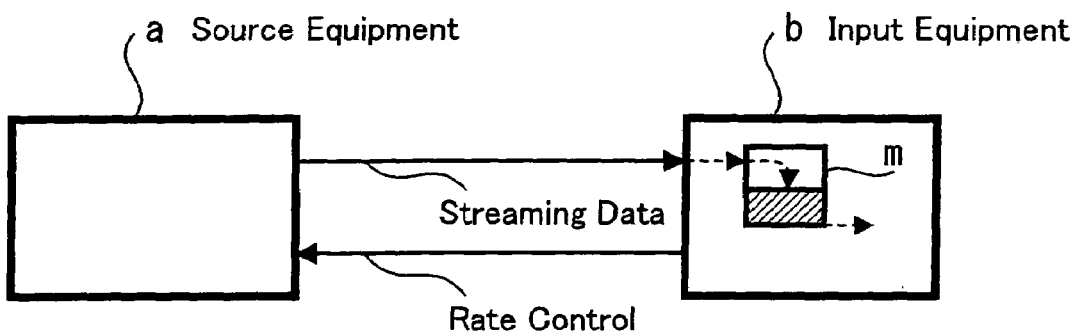
FIG. 3 is a drawing showing an example of rate control.
Figure 4:
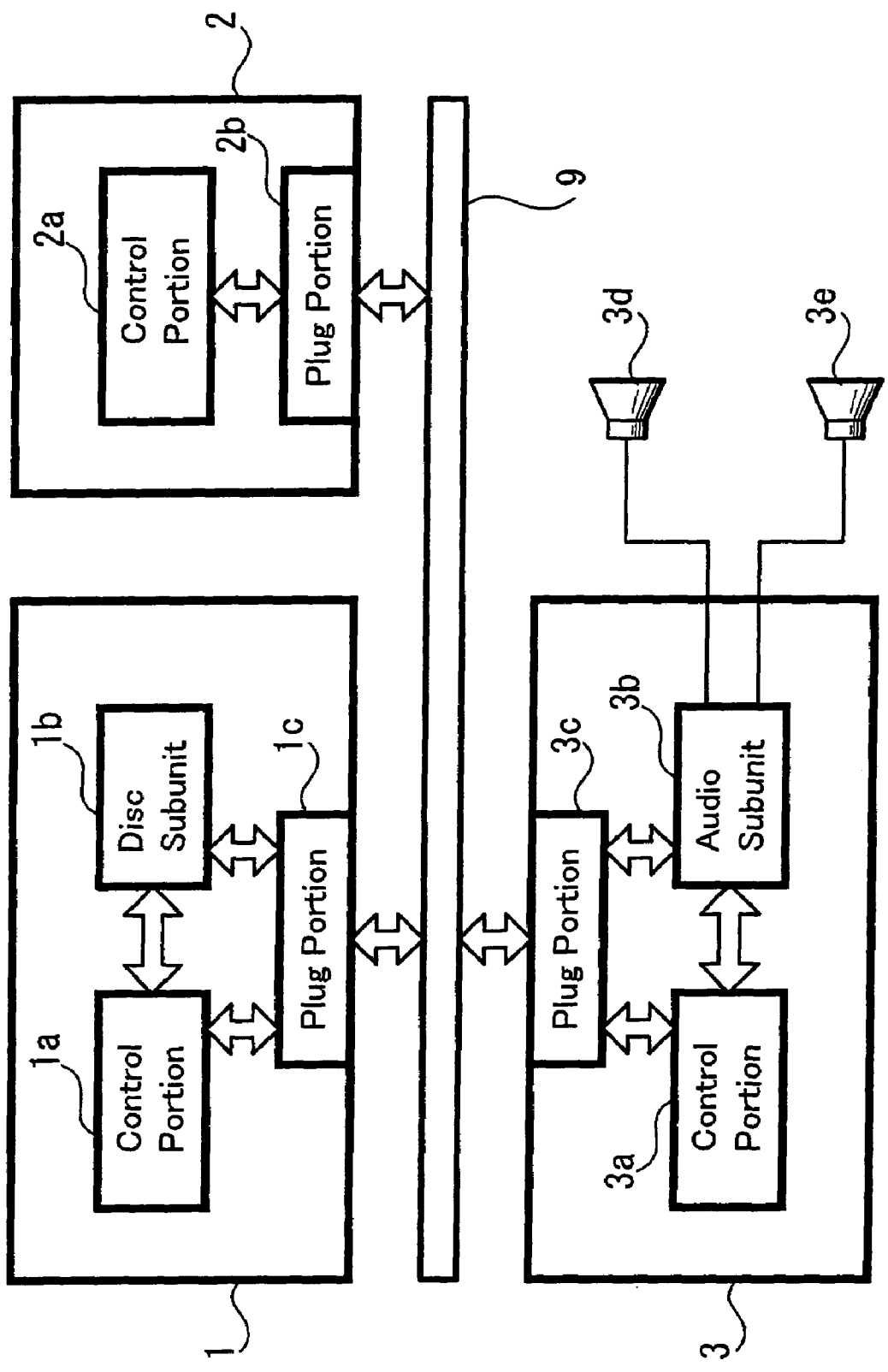
FIG. 4 is a block diagram showing an example of a system configuration in one aspect of this invention.

An example of the configuration of a network system to which this invention is applied is explained, referring to FIG. 4. This network system is a system which connects a plurality of equipment units via an IEEE 1394 serial data bus 9. Here, a disc reproduction apparatus 1, control apparatus 2, and amplifier apparatus 3 are connected by a bus 9, as shown in FIG. 4. As the control apparatus 2, for example, a personal computer can be employed.

Each of the equipment units comprises an IEEE 1394 bus connector terminal, and implements functions enabling control by AV/C commands. The control apparatus 2 is equipment (a controller) which performs transmission control on the bus 9. Other equipment, not shown, which is connected to the bus 9 may be configured to perform transmission control on the bus 9, and the disc reproduction apparatus 1 or amplifier apparatus 3 may also comprise controller functions.

Seen in terms of functions stipulated by AV/C commands, each of the equipment units 1, 2, 3 can be seen as comprising a subunit which executes processing to realize various functions, and a plug portion to perform input and output of data between the bus 9 and internal subunit. That is, the disc reproduction apparatus 1 comprises a control portion 1a which executes control functions, and a disc subunit 1b which performs reproduction from a disc under control of the control portion 1a. The control apparatus 2 comprises a control portion 2a which executes control of transmission on the bus 9. The amplifier apparatus 3 comprises a control portion 3a which executes control functions, and an audio subunit 3b which performs processing and output of audio signals. The audio subunit 3b is connected to speakers 3d, 3e. Further, the equipment units 1, 2, 3 respectively comprise plug portions 1c, 2b, 3c. Each of the plug portions 1c, 2b, 3c implements a plurality of plugs, and can be connected to a plurality of channels on the bus 9.

Figure 5:
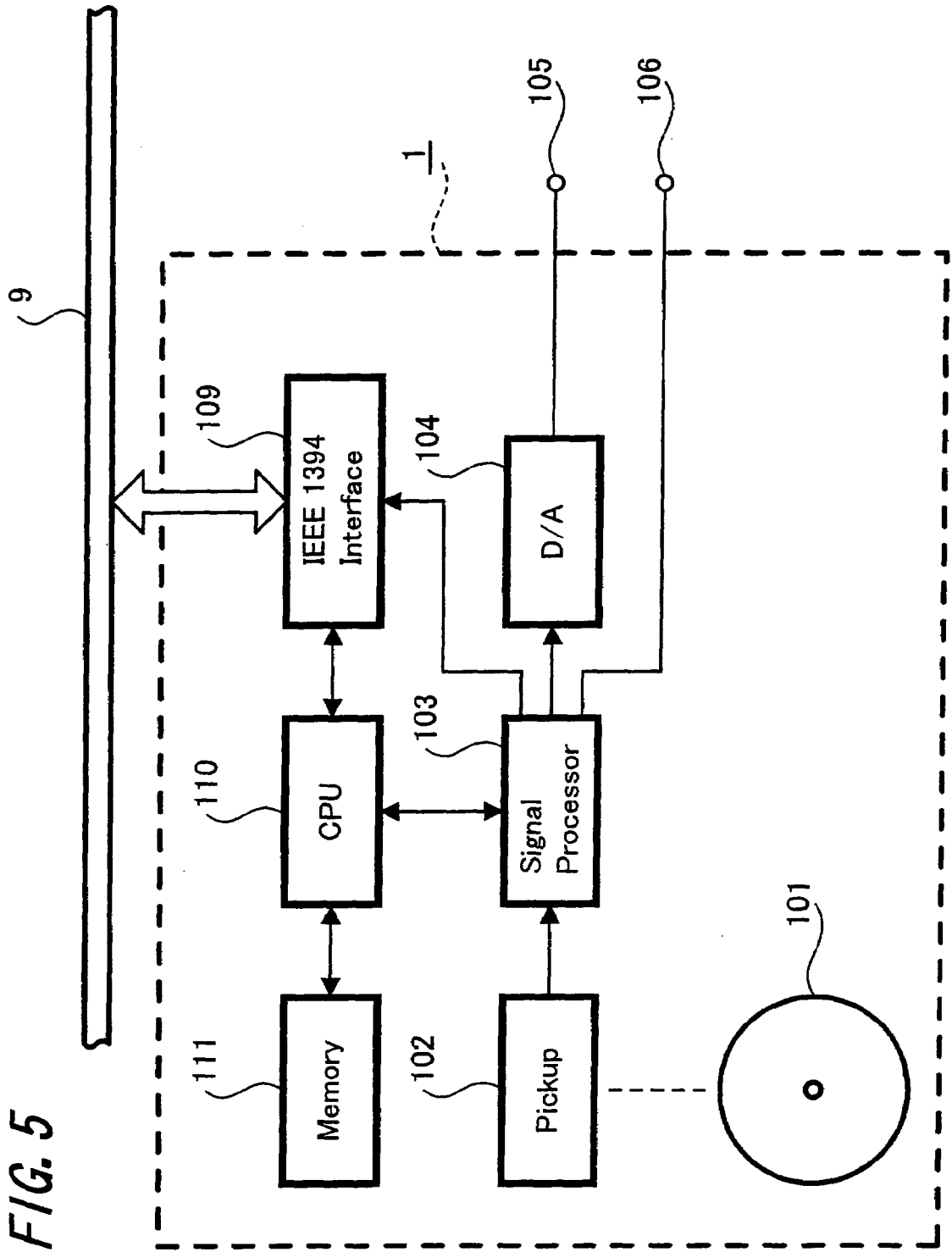
FIG. 5 is a block diagram showing an example of the internal configuration of a disc reproduction apparatus in one aspect of this invention.

FIG. 5 shows one example of the internal configuration of a disc reproduction apparatus 1. This disc reproduction apparatus 1 is an apparatus which reproduces digital audio data recorded on an optical disc 101. Optical discs 101 from which data can be reproduced by the reproduction apparatus 1 include, in addition to CDs (Compact Discs) DVDs (Digital Video Discs or Digital Versatile Discs) and other optical discs on which data is recorded in audio and other formats.

The configuration of the disc reproduction apparatus 1 is explained below. Data recorded on an optical disc 101 loaded into the reproduction apparatus 1 is read optically by an optical pickup 102, and the signal read by the optical pickup 102 is supplied to and processed by a signal processing portion 103 to obtain reproduction data; after converting this reproduction data into an analog signal using a digital/analog converter 104, it is output from an analog output terminal 105, and supplied to audio equipment or similar connected to this terminal 105. Digital audio data not converted into analog form by the digital/analog converter 104 is output from a digital output terminal 106. Also, audio data reproduced from the disc 101 is supplied to an IEEE 1394 bus interface 109, enabling transmission over the connected bus 9.

Reproduction operation within the disc reproduction apparatus 1, and data transmission over the bus 9, are executed under control of a central processing unit (CPU) 110. The CPU 110 is connected to memory 111 which stores data necessary for control.

Figure 6:
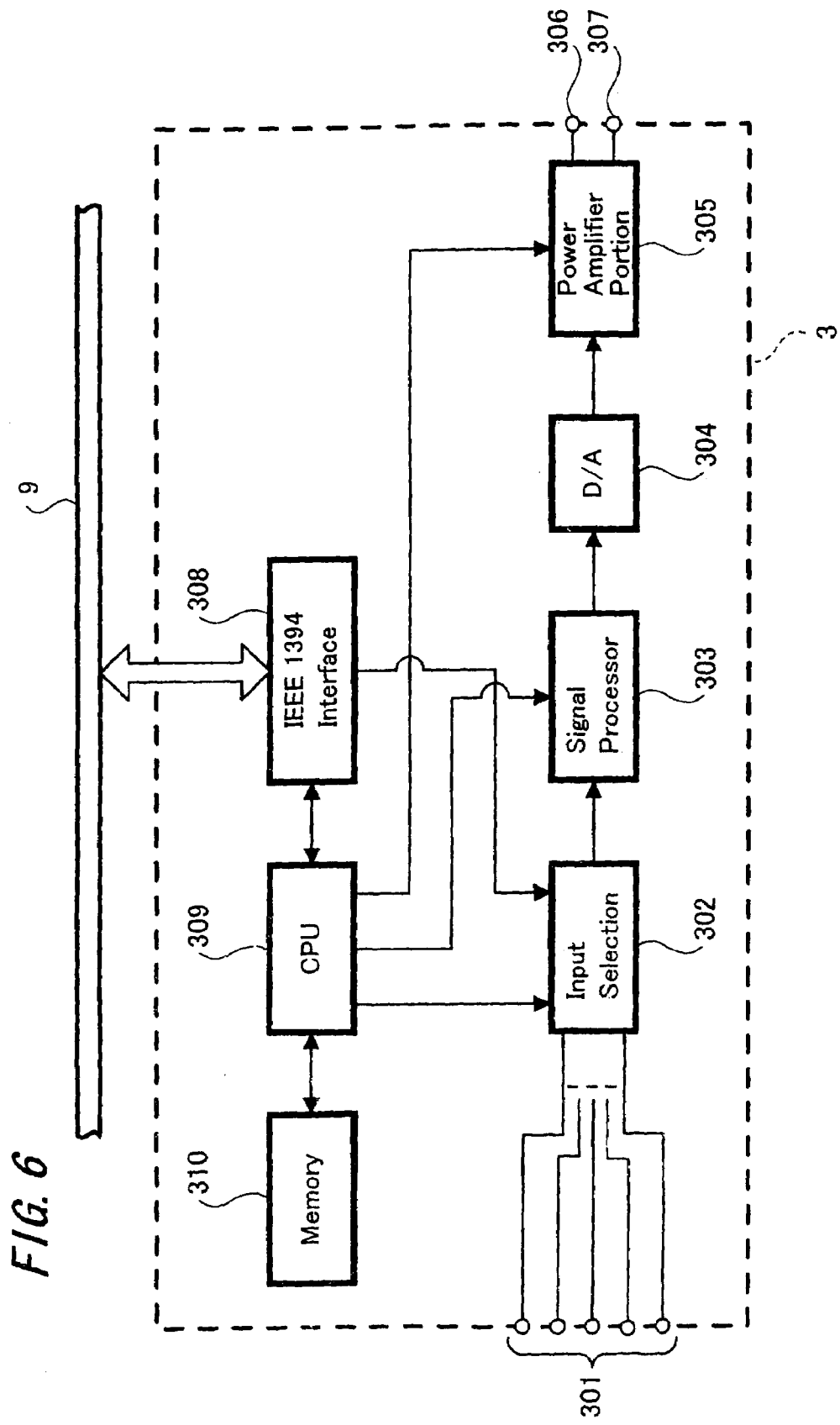
FIG. 6 is a block diagram showing an example of the internal configuration of an amplifier apparatus in one aspect of this invention.

FIG. 6 shows an example of the internal configuration of an amplifier apparatus 3. The amplifier apparatus 3 comprises an input terminal group 301, to which are supplied audio signals (digital or analog signals) from a plurality of audio equipment units; audio signals among the plurality of audio signals obtained from this input terminal group 301 are selected by an input selection portion 302. Then the necessary signal processing of the selected audio signals is performed by a signal processing portion 303. As signal processing, correction of signal characteristics, multichannel processing and other processing is performed, for example using a digital processing circuit called a DSP (Digital Signal Processor). When the selected input signals are analog signals, processing is performed after conversion into digital signals within the signal processing portion 303.

The output from the signal processing portion 303 is supplied to the digital/analog converter 304 and converted into analog audio signals, and the converted audio signals are supplied to a power amplifier portion 305, and are amplified to an output capable of driving speakers. The output from the power amplifier portion 305 is supplied to speakers connected via the speaker terminals 306, 307.

The amplifier apparatus 3 of this example comprises an IEEE 1394 bus interface portion 308, and, when the interface portion 308 receives transmitted audio data from the bus 9, enables supply of the received audio data to the signal processing portion 303 via the input selection portion 302.

Signal processing operation within the amplifier apparatus 3, and reception operation via the bus 9, are executed under control of the central processing unit (CPU) 309. The CPU 309 is connected to memory 310 which stores data necessary for control.

Figure 7:
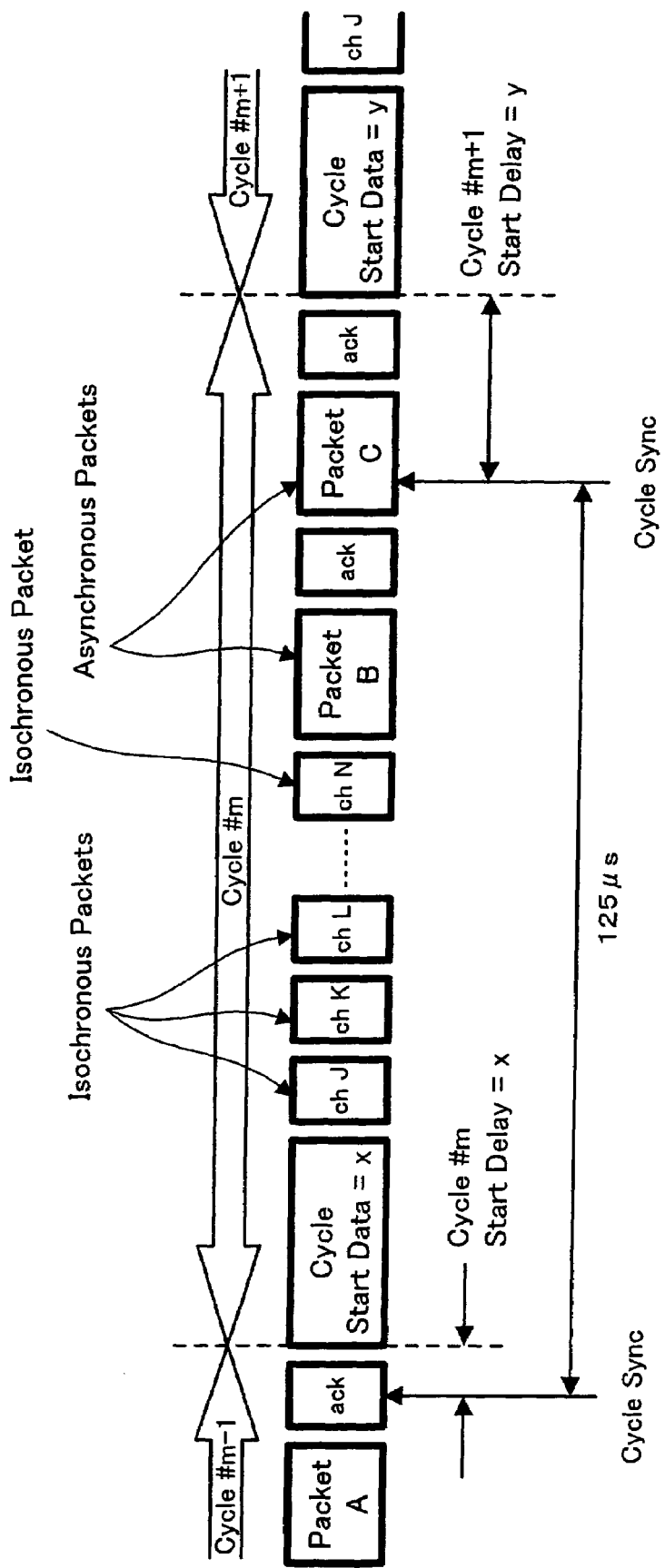
FIG. 7 is an explanatory drawing showing an example of the cyclical structure of data transmission on an IEEE 1394 bus.

Next, the state in which data is transmitted on the IEEE 1394 bus 9 to which the above-described equipment is connected is explained. FIG. 7 shows the cyclic structure of data transmission by equipment connected via an IEEE 1394 bus.

On this IEEE 1394 bus, data is divided into packets and is transmitted by a time-division method based on a cycle 125 µs long. This cycle is created by a cycle start signal supplied from a node (an equipment unit connected to the bus) having cycle master functions. An isochronous packet secures the bandwidth (expressed in time units, but called bandwidth) necessary for transmission of all cycles from the beginning. Consequently in isochronous transmission, transmission of the data within a fixed time is guaranteed. However, when a transmission error occurs there is no framework for protection, and so data is lost. During the time in each cycle not used for isochronous transmission, a node which has secured the bus as the result of arbitration can employ acknowledge and retry messages in asynchronous transmission of asynchronous packets to guarantee reliable transmission, but the transmission timing is not constant.

In order for a node (equipment) connected to the network to perform isochronous transmission, the node must support isochronous functions. Also, at least one node among the nodes connected to the IEEE 1394 serial bus just have cycle master functions. Further, at least one node among the nodes connected to the IEEE 1394 serial bus must have isochronous resource manager functions.

Figure 8:
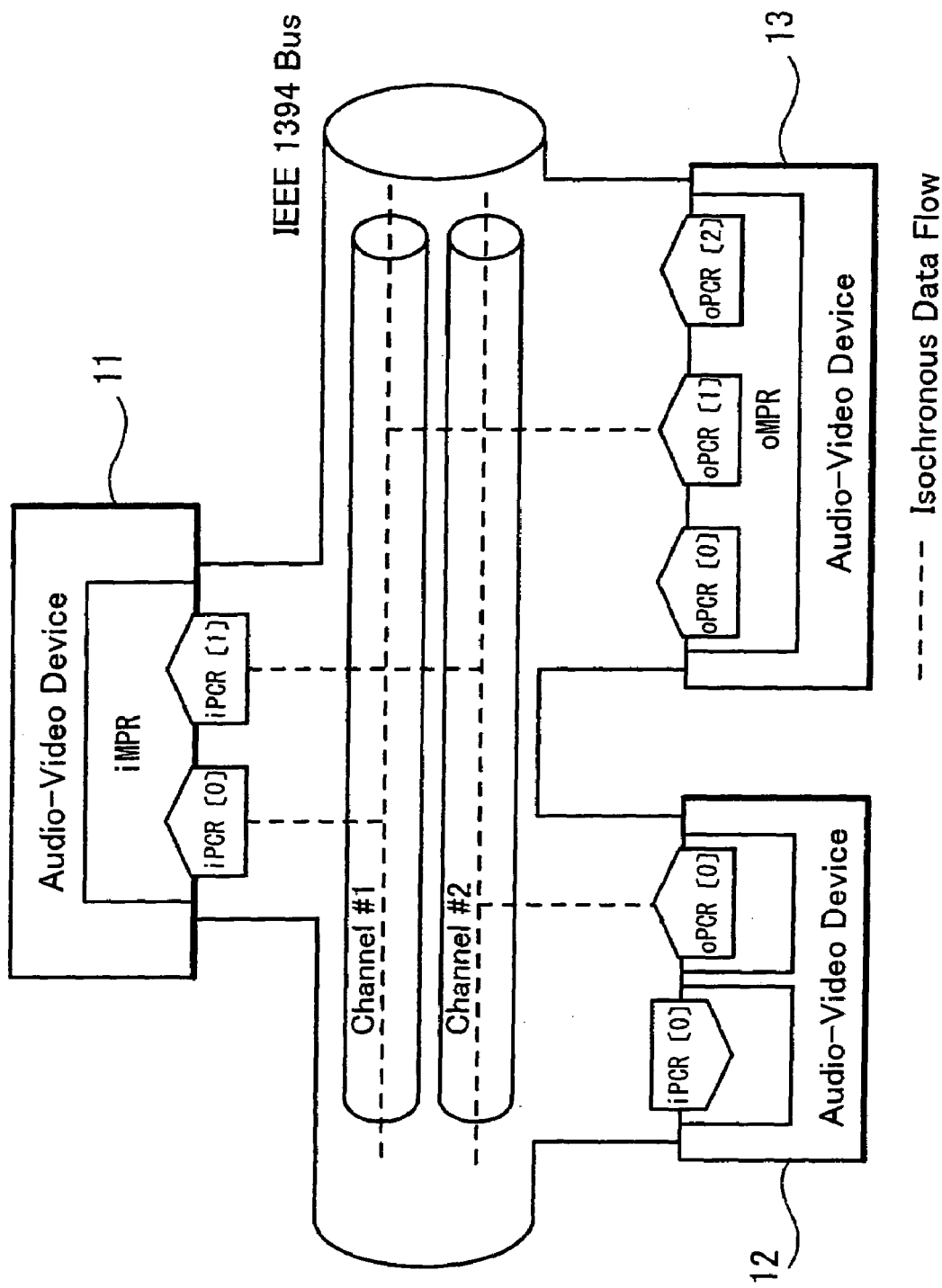
FIG. 8 is an explanatory drawing showing an example of connections using an IEEE 1394 bus.

FIG. 8 shows the relation between the plugs, plug control registers, and isochronous channels necessary for data transmission on the bus. The audio-video devices (AV-devices) 11 to 13 are connected by the IEEE 1394 serial bus. Among oPCR[0] to oPCR[2], the transmission rate and oPCR number of which have been stipulated by the oMPR of the AV device 13, isochronous data is transmitted over channel #1 of the IEEE 1394 serial bus, specified by oPCR[1]. Among the iPCR[0] and iPCR[1], the transmission rate and iPCR number of which have been stipulated by the iMPR of the AV device 11, by means of iPCR[0], the AV device 11 reads the isochronous data transmitted over channel #1 of the IEEE 1394 serial bus. Similarly, the AV device 12 transmits isochronous data over channel #2 specified by oPCR[0], and the AV device 11 reads isochronous data from channel #2 specified by iPCR[1].

Settings are made such that data transmitted from the output plug of the equipment that is the data transmission origin over the bus, using a channel secured in this way, can be received by an input plug of the equipment which is to receive the data. Processing to set the channel and plugs in this way and establish a connection is executed under control of prescribed equipment (a controller) connected to the bus.

Figure 9:
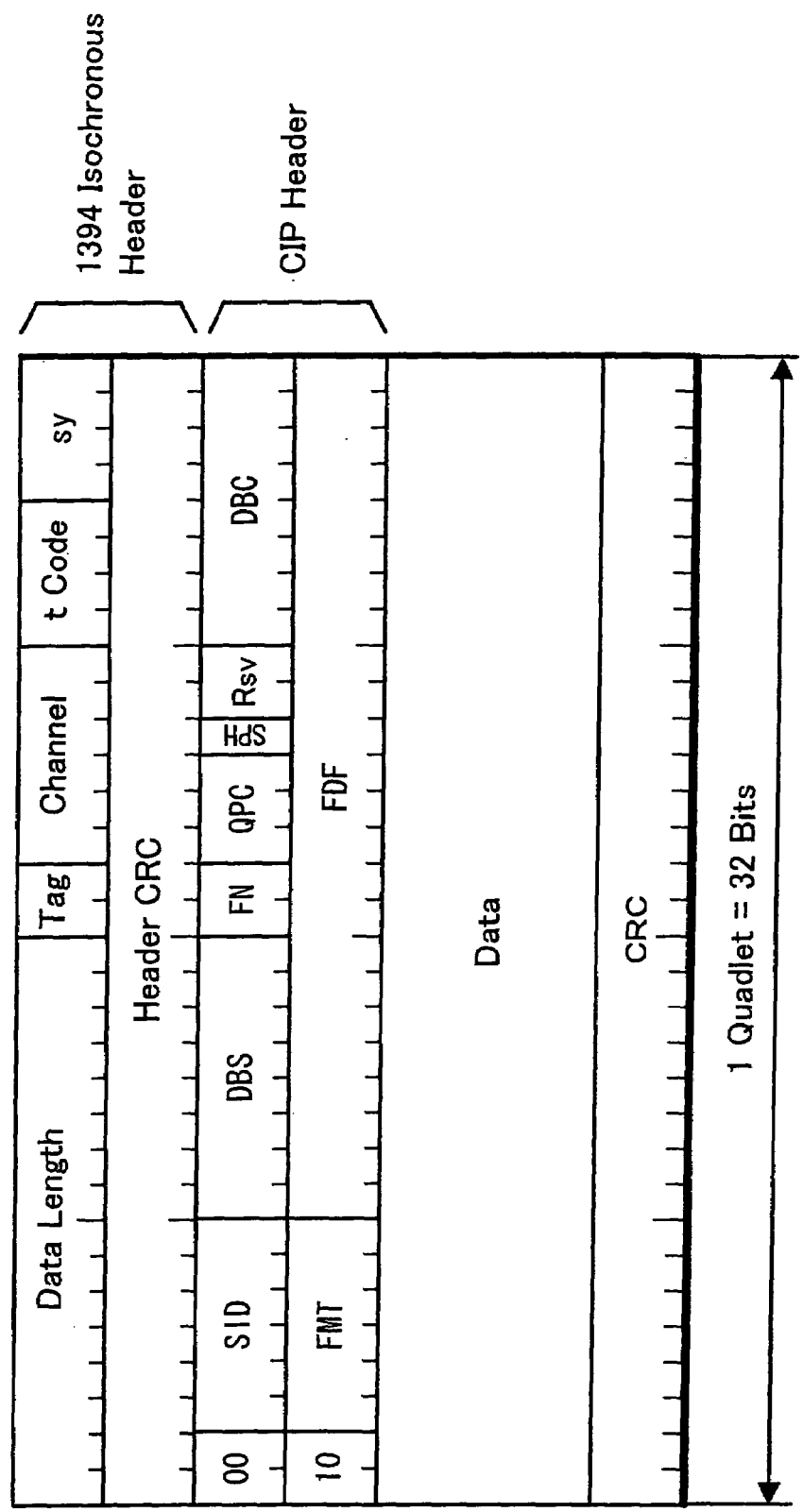
FIG. 9 is an explanatory drawing showing an example of the configuration of a packet in isochronous transfer mode.

In this way, data is transmitted between equipment connected by an IEEE 1394 serial bus. FIG. 9 shows an example of the data structure of packets when using an IEEE 1394 serial bus in isochronous transfer mode to transmit streaming data.

In FIG. 9, packets are shown in units of quadlets (1 quadlet=32 bits). The section of the first two quadlets is an isochronous packet header, in which are placed, in addition to the data length, tag, channel and other data, a data error correction code CRC. The next two-quadlet section is called the CIP header, and is a header used when transmitting audio data and video data. In this CIP header are placed an SID, which is the node ID for the data transmission source (source equipment); the units in which the packet of streaming data is encapsulated DBS; the number of divisions prior to packet encapsulation FN; the number of quadlets added before data division QPC; the packet header flag of the source equipment SPH; the counter used for detection of packet losses DBC; and the signal format ID FMT.

There are also cases in which other data, which may support the format of streaming data transmitted in the isochronous packet, is placed in the CIP header. For example, the sampling frequency of audio data, or a flag (N flag), described below, indicating that rate control is being performed, may be placed in the header. In succession to a CIP header configured in this way, a prescribed amount of streaming data is added. At the end of the packet, an error correction code CRC is added.

Streaming data with a data structure like that described above is transmitted; but equipment connected via an IEEE 1394 serial bus also transmits commands, responses, and other control packets in asynchronous transfer mode. In the system of this example, the AV/C commands stipulated as commands for control of equipment connected via the IEEE 1394 serial bus are used to enable control of each equipment unit and judgment of equipment states. Data used in these AV/C commands is explained below.

Figure 10:
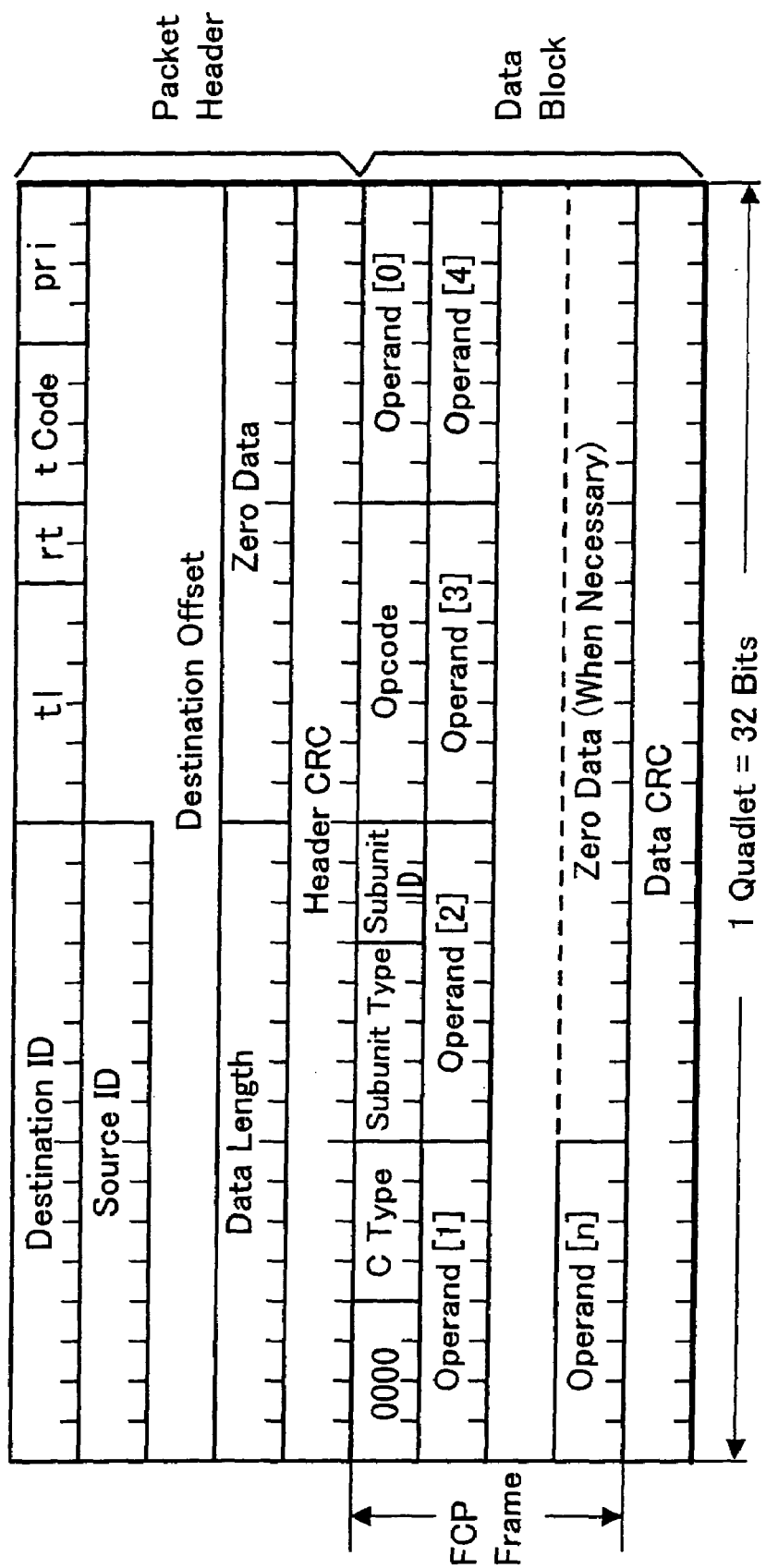
FIG. 10 is an explanatory drawing showing an example of the configuration of data transmitted using an AV/C command.

FIG. 10 shows the data configuration of packets when transmitting commands and responses as AV/C commands. In the case of AV/C commands, commands and responses are transmitted in asynchronous transfer mode. AV/C commands are part of a command set to control audio and video equipment, with CTS (command set ID)="0000". In order not to place a load on the bus or audio-video equipment, responses to these commands are to be issued within 100 ms. The packet shown in FIG. 10 is also shown in units of one quadlet. The section of the beginning five quadlets is the header portion of the packet; the remaining portion is the data block.

The destination ID in the header portion indicates the destination. CTS indicates the ID of the command set; for the AV/C command set, CTS="0000". The ctype/response field indicates the function category of a command when the packet is a command, and the command processing result when the packet is a response.

In broad terms, four types of commands are defined: (1) commands which control functions from outside (CONTROL), (2) commands which query states from outside (STATUS), (3) commands which query from outside whether there is support for control commands (GENERAL INQUIRY (support for opcodes) and SPECIFIC INQUIRY (support for opcodes and operands), and (4) commands which request notification of state changes (NOTIFY).

A response is returned according to the command type. Responses to a CONTROL command are NOT IMPLEMENTED, ACCEPTED, REJECTED, and INTERIM (a tentative response). Responses to a STATUS command are NOT IMPLEMENTED, REJECTED, IN TRANSITION, and STABLE. Responses to GENERAL INQUIRY and SPECIFIC INQUIRY commands are IMPLEMENTED and NOT IMPLEMENTED. Responses to a NOTIFY command are NOT IMPLEMENTED, REJECTED, INTERIM, and CHANGED. Commands and responses other than those described here may also be defined.

A subunit type is provided in order to identify the functions within the equipment; for example, "tape recorder/player", "tuner" or similar types may be assigned. In order to perform discrimination when there exist a plurality of subunits of the same type, addressing is performed using a subunit ID as a discrimination number. An opcode represents a command, and an operand represents a command parameter. "Additional operands" is a field which is added as necessary. "Padding" is also a field which may be added as necessary. "Data CRC" (Cyclic Redundancy Check" is an error correction code used for error checking during data transmission.

FIG. 11 shows specific examples of AV/C commands. The left-hand column in FIG. 11 shows specific examples of ctype/response values. In the figure, the upper part lists commands, and the lower part lists responses. "0000" is assigned to CONTROL, "0001" to STATUS, "0010" to SPECIFIC INQUIRY, "0011" to NOTIFY, and "0100" to GENERAL INQUIRY. "0101" through "0111" are reserved for future specifications. Also, "1000" is assigned to NOT IMPLEMENTED, "1001" to ACCEPTED, "1010" to REJECTED, "1011" to IN TRANSITION, "1100" to IMPLEMENTED/STABLE, "1101" to CHANGED, and "1111" to INTERIM. "1110" is reserved for future specifications.

In the center column of FIG. 11, specific examples of subunit types are shown. "00000" is assigned to "Video Monitor", "00011" to "Disk recorder/Player", "00100" to "Tape recorder/Player", "00101" to "Tuner", "00111" to "Video camera", "11100" to "Vendor unique", and "11110" to "Subunit type extended to next byte". "11111" is assigned to a unit; this is used when sending to the equipment itself, for example when turning the power supply on and off.

In the right-hand column of FIG. 11, specific examples of opcodes are shown. An opcode table exists for each subunit type; here, opcodes for the case in which the subunit type is "Tape recorder/Player" are shown. Also, operands are defined for each opcode. Here "00h" is assigned to VENDOR-DEPENDENT, "50h" to SEARCH MODE, "51h" to TIMECODE, "52h" to ATN, "60h" to OPEN MIC, "61h" to READ MIC, "62h" to WRITE MIC, "C1h" to LOAD MEDIUM, "C2h" to RECORD, "C3h" to PLAY, and "C4h" to WIND.

Using AV/C commands stipulated in this way, equipment connected to the bus is controlled, and based on this control, data is transmitted between-equipment connected to the bus. The commands, responses, and subunit types shown in FIG. 11 are representative, but others are defined besides these, and in addition, other commands and subunit types may defined in future and assigned to as yet undefined values.

Next, a case in which audio data or other streaming data is transmitted between equipment connected to the network of this example is explained. In this example, the disc reproduction apparatus 1 is the audio data output equipment (source equipment), and audio signals sent to the bus from this source equipment are received by the amplifier apparatus 3 which is the input equipment (sink equipment), and audio is output (acoustically broadcast) from the speakers 3d, 3e connected to the amplifier apparatus 3.

Figure 12:
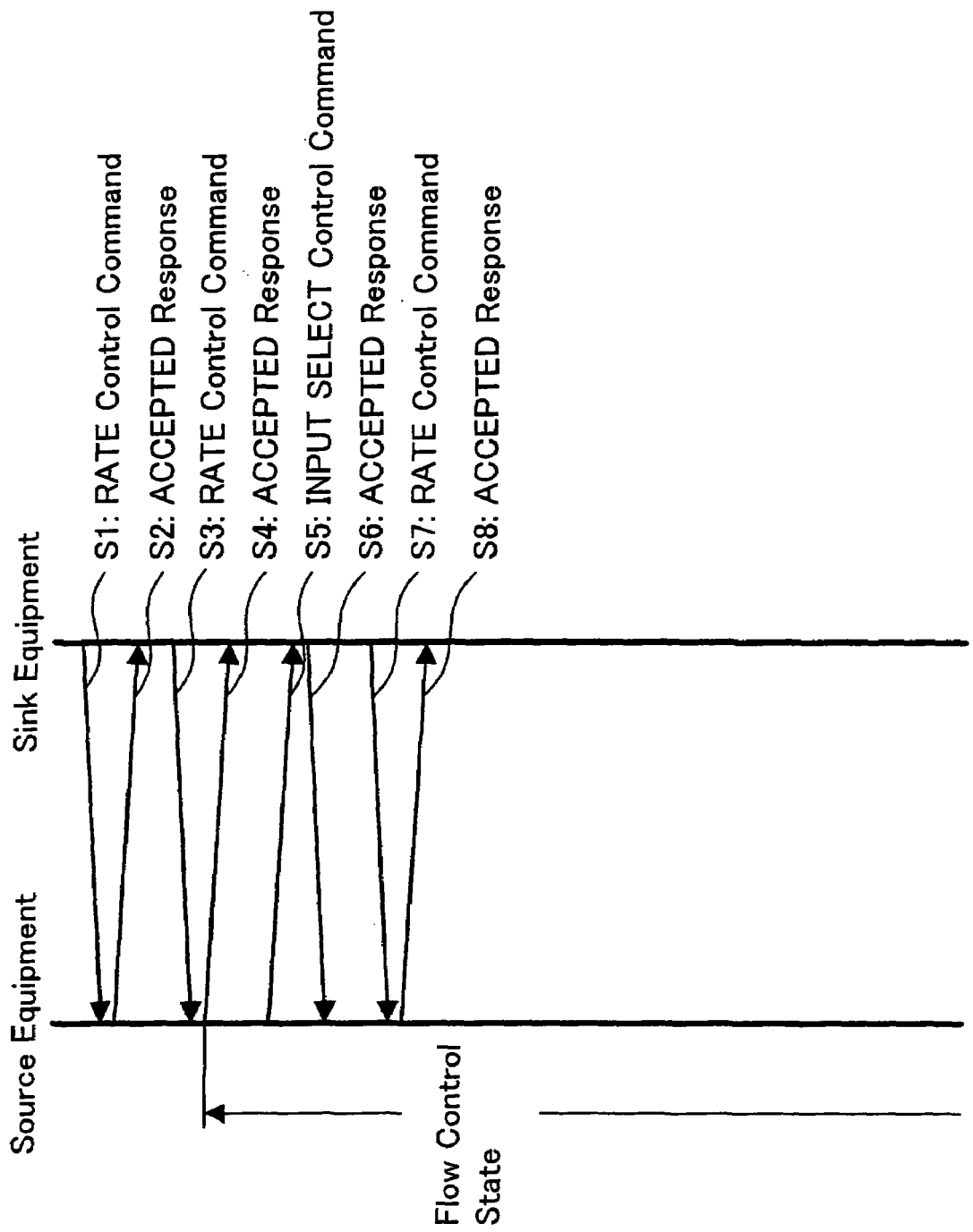
FIG. 12 is an explanatory drawing showing an example of processing of flow control in one aspect of this invention.

In the case of this example, rate control is performed to transmit streaming data (audio data) from the disc reproduction apparatus 1 to the amplifier apparatus 3. First, the state in which this rate control is performed is explained, referring to FIG. 12. The source equipment shown in FIG. 12 is equivalent to a disc reproduction apparatus 1 which outputs audio data to a network; the sink equipment is equivalent to an amplifier apparatus 3 to which audio data is input from the network. Data transmitted between the source equipment and sink equipment for the purpose of rate control (commands and responses) is data configured as the above-described AV/C commands.

First, the sink equipment (amplifier apparatus 3) sends a base configure subfunction of a rate control command specifying the reference rate for rate control, to the source equipment (disc reproduction apparatus 1) (step S1), and the sink equipment 3 verifies a response to this command (step S2). Next, the sink equipment 3 sends a sink select subfunction of a rate control command specifying execution of rate control, to the source equipment 1 (step S3). On receiving this command, the source equipment 1 sends a response indicating that processing of the command was performed normally to the sink equipment 3 (step S4). At this time, the source equipment 1 becomes target equipment for successful execution of rate control (command-based rate control), and stores the node ID of the amplifier apparatus 3 which is the controller for the rate control. By this means, the disc reproduction apparatus 1 judges that the amplifier apparatus 3 which is the controller is the input equipment for the streaming data which is controlled by rate control.

Subsequently, when there is a need to change the rate of transmission of streaming data through rate control, the amplifier apparatus 3 which is the controller sends a flow control subfunction of a rate control command to the disc reproduction apparatus 1 (step S7), and verifies a response to this command (step S8). As the value of the data for the rate specified by this command, a transmission rate is set which is appropriate to the state of internal signal processing of the streaming data input to the amplifier apparatus 3. Also, while this rate control is successfully continued, the amplifier apparatus 3 which is the controller must repeatedly send a flow control subfunction of a rate control command to the disc reproduction apparatus 1, at an arbitrary time within a 5-second interval as a command interval. In FIG. 12, this flow control subfunction is omitted. In this way, streaming data is transmitted via the bus line 9 in a state in which flow control is performed with the amplifier apparatus 3 (the input equipment) as the controller.

After the disc reproduction apparatus 1 becomes the target equipment for successful execution of this rate control, a path change subfunction of an input select control command is sent to the amplifier apparatus 3 which is the input equipment for the streaming data (step S5). On obtaining a response to this command (step S6), the disc reproduction apparatus 1 confirms the input plug for streaming data of the amplifier apparatus 3, as well as the subunit connected internally to this input plug, and the destination flag of the subunit.

Next, in a state in which audio data (streaming data) is transmitted from the disc reproduction apparatus 1 to the amplifier apparatus 3 via the bus line 9 in this way, processing when the format of the audio data changes during transmission is explained. Here, it is assumed that two content types, content A and content B, are recorded on the disc 101 data from which is reproduced by the disc reproduction apparatus 1, and in succession to reproduction of content A, reproduction operation to reproduce content B is performed. It is further supposed that in content A, audio data in a first format is recorded, while in content B, audio data in a second format is recorded.

With respect to the difference between the first format of the audio data of content A and the second format of the audio data of content B, various changes are conceivable. For example, the audio data sampling frequency may change. Or, the number of channels may change. Even in cases where there is no change in the sampling frequency or number of channels, the data configuration may change due to differences in audio data standards. As one change in the streaming data configuration due to standard changes, for example, a change may occur from a format stipulated by IEC 60958 to a format stipulated as DVD audio.

When such audio data format changes occur, there are cases in which, for example, as already explained in FIG. 10, values in the CIP header added to isochronous transfer packets change to values of the corresponding format, and there are cases in which the CIP header values do not change even when the format changes.

Figure 13:
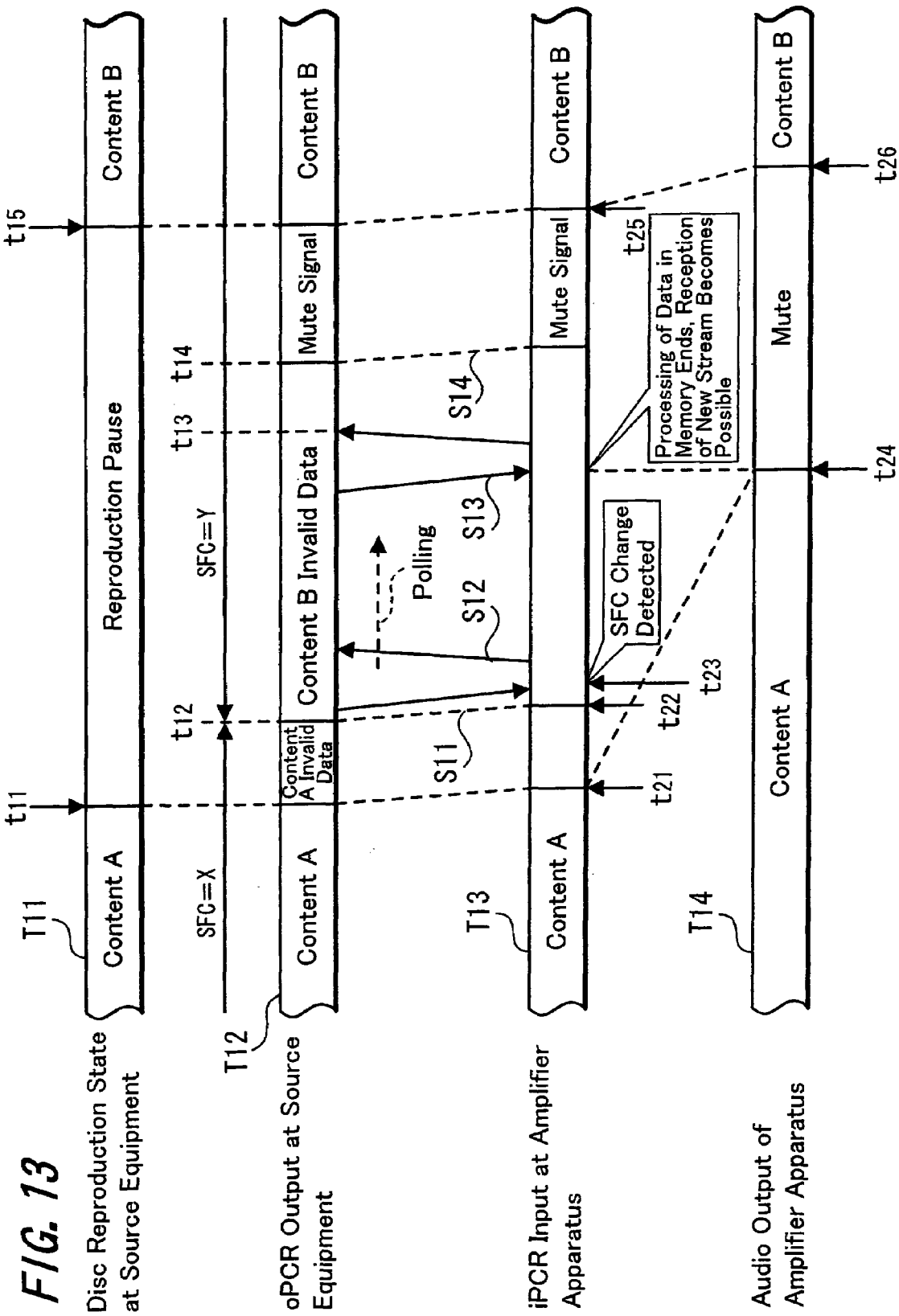
FIG. 13 is an explanatory drawing showing a transmission example (an example of a change in the sampling frequency) in one aspect of this invention.

To explain examples of processing in each of these cases, first, an example of a case in which the sampling frequency changes between a first format and a second format, and data contained in the CIP header and indicating the sampling frequency changes, is explained referring to FIG. 13.

In the example of FIG. 13, the content A has a sampling frequency SFC=X, and the content B has a sampling frequency SFC=Y. As is shown as the disc reproduction state T11 of the source equipment, by reproducing the content A using the disc reproduction apparatus 1, the audio data of the content A is output from an output plug oPCR of the source equipment to the bus line 9 in isochronous transfer mode using a prescribed transmission channel, as shown by the output state T12 of the output plug oPCR of the source equipment; and, as is shown as the state T13 of an input plug iPCR of the amplifier apparatus, this audio data is input to the input plug iPCR of the amplifier apparatus 3, and, as indicated in the audio output state T14 of the amplifier apparatus 3, the audio of the content A is output from the speaker apparatus connected to the amplifier apparatus 3. This is an example of the performance of rate control, and in the amplifier apparatus 3, processing of input audio data is performed after temporary accumulation in buffer memory; thus audio is output to the speakers with a delay equal to the time of accumulation in the buffer memory.

Here, suppose that reproduction of content A ends at time $t_{11}$. Processing then proceeds to reproduction of content B; but at this time the CPU 110 of the disc reproduction apparatus 1 judges that the formats of the audio data of content A and content B are different, and so the disc reproduction state is put into a reproduction paused state. Then, invalid audio data in the format of content A is output from the output plug oPCR of the disc reproduction apparatus 1, to the channel to which audio data was being output. This content A "invalid data" is data which is indicated to be ancillary data attached to audio data, and invalid audio data (no-data). The format of the audio data is the same format as the data of the content A.

This invalid audio data in the format of the content A is output to the bus line 9 for a comparatively short time (for example, several tens of milliseconds), from time $t_{11}$, at which reproduction of content A ends, until time $t_{12}$. Until this time, the format of the audio data output is the same format as the audio data of the content A, and is data with a sampling frequency SFC=X. As the invalid audio data, for example, audio data with level 0 is used.

Then, at time $t_{12}$, invalid audio data in the format of content B is output from the output plug oPCR of the disc reproduction apparatus 1. Here too, the content B "invalid data" is data which is indicated to be ancillary data attached to audio data, and invalid audio data (no-data). However, the audio data is audio data in the second format (data in the CIP header is also data in the second format), configured similarly to content B data, and is data with sampling frequency SFC=Y. As this invalid audio data also, for example, audio data with level 0 is used.

As indicated by the state T13 in FIG. 13, as data input from the input plug iPCR of the amplifier apparatus 3, input of the audio data of content A ends at time $t_{21}$, and from time $t_{21}$ to time $t_{22}$, invalid audio data in the format of the content A is input, and after time $t_{22}$, invalid audio data in the format of the content B is input. When audio data in the format of content B is input, at time $t_{23}$, delayed slightly from the time $t_{22}$ at which input is begun, the amplifier apparatus 3 detects a change to the sampling frequency SFC=Y from the data relating to sampling frequency contained in the CIP header of the transmitted data.

When the state is then entered in which invalid audio data in the format of the content B is transmitted to the bus line 9, the disc reproduction apparatus 1 which is the source equipment sends an input plug signal format status command, to investigate the state of an input plug of the input equipment (step S11). Here the input plug the state of which is being investigated is the input plug confirmed by the path change subfunction of the input select control command in step S5, shown in FIG. 12.

The command in step S11 has for example the configuration shown in FIG. 14. That is, data for [INPUT PLUG SIGNAL FORMAT], which is the applicable command, is placed in the [opcode] section, data identifying the plug the state of which is to be investigated is placed in the [operand(0)] section, and the maximum value FF is placed in the [operand(1)] and subsequent sections. This data is inserted into the packet configuration shown in FIG. 10.

When this command is transmitted from the disc reproduction apparatus 1 to the amplifier apparatus 3 via the bus line 9 as step S11, the amplifier apparatus 3 returns a response to this input plug signal format status command to the disc reproduction apparatus 1 (step S12). In this response, the command data in the [opcode] and [operand(0)] sections of the command are left unchanged, and in [operand(1)] and subsequent sections, data in the FMT and FDF sections of the CIP header of data being input at that time at the subunit is inserted.

In the case of this example, when a response is sent in step S12 of FIG. 13, the data of content A is still being output, as indicated by state T14 in FIG. 13; consequently the FMT and FDF data of the CIP header for the format of content A is returned, and so the disc reproduction apparatus 1 confirms that preparations for input of content B by the amplifier apparatus 3 are not completed.

Then, in the disc reproduction apparatus 1, with the current streaming data output (invalid data in content B format) maintained, each time a prescribed interval (for example, approximately 200 ms) has elapsed, the transmission of an input plug signal format status command of step S11 is performed, and this is repeated until it can be confirmed through a response that preparations for input of content B data by the amplifier apparatus 3 have been completed. That is, polling processing is executed until it can be performed that preparations for content B input have been completed.

In the example of FIG. 13, as indicated by the state T14 of FIG. 13, at the end of the output of content A audio data accumulated in the buffer memory at time $t_{24}$, switching of processing in the subunit so as to enable input of data with a sampling frequency SFC=Y is executed, and upon receiving an input plug signal format status command after time $t_{24}$ (step S13), FMT and FDF data of the CIP header of data in the same format as the content B data being received is inserted into the response, which is transmitted (step S14).

When the response in step S14 is received by the disc reproduction apparatus 1 at time $t_{13}$, after a prescribed interval (for example, several tens of milliseconds) at time $t_{14}$, invalid data in the format of content B output from the disc reproduction apparatus 1 is changed to valid data in the format of content B. However, here a mute signal with audio level 0 (no-sound state) is output for a comparatively short interval (for example, several hundreds of milliseconds) until time $t_{15}$. This mute signal streaming data can be discriminated as the format of content B, and enables the amplifier apparatus 3 to make all internal settings for signal processing, while also being data which mutes the audio within the amplifier apparatus 3 as well as the output thereof, and contains ancillary data attached to the audio data.

At time $t_{15}$, as shown by state T11 in FIG. 13, the reproduction pause of the disc 101 is cancelled by the disc reproduction apparatus 1, reproduction of audio data recorded as content B is begun, and as shown in state T12 of FIG. 13, output of content B audio data to the bus line 9 from an output plug is begun.

The content B audio data which has begun to be transmitted in this way is input at time $t_{25}$ to the amplifier apparatus 3, and at time $t_{26}$, somewhat later than time $t_{25}$ due to time required for accumulation in buffer memory and data processing, the mute state is canceled and the audio of content B begins to be output from the speakers connected to the amplifier apparatus 3.

When the format of transmitted audio data changes in this way, after the output equipment has confirmed that the input equipment can reliably process data in the changed format, transmission of content B audio data is begun; hence content B can be reliably output from the beginning portion, so that loss of the beginning of the content can be prevented. Further, content A, which is data preceding this change, can also be output up to the end, so that there is no interruption during processing of previously input data. Hence even if there is a change in the format of streaming data being transmitted, complete loss-free data transmission and processing can be performed.

In the example shown in FIG. 13, as processing to confirm the completion of preparations for data input from the disc reproduction apparatus 1 to the amplifier apparatus 3, an input plug signal format status command is sent, and so-called polling processing is performed, repeating transmission of this command until the completion of preparations for input of content B can be confirmed through a response; however, a NOTIFY command, which is an AV/C command notifying of a change in the prepared state, may be used.

That is, as step S11, in place of an input plug signals format status command, an input plug signal format notify command is transmitted. On receiving this notify command, in step S12 the amplifier apparatus 3 immediately returns an INTERIM response, which is a response indicating the state at the time the command is received and which acknowledges notification; then, when preparations for reception of content B are completed immediately afterward at time $t_{24}$, CHANGED data which is a response indicating that the state has changed is sent. Upon receiving this [CHANGED] data, the disc reproduction apparatus 1 judges that preparations for input of content B have been completed by the amplifier apparatus 3.

In the example shown in FIG. 13, at the time when reproduction of content A ends, invalid data in the format of content A is briefly transmitted; however, this invalid data in the format of content A may be omitted, and immediately after the end of reproduction of content A, transmission of invalid data in the format of content B may be begun. Similarly, after sending invalid data in the format of content B, a mute signal is transmitted for a prescribed interval, after which transmission of content B data is begun; however, transmission of this mute signal may also be omitted.

Figure 15:
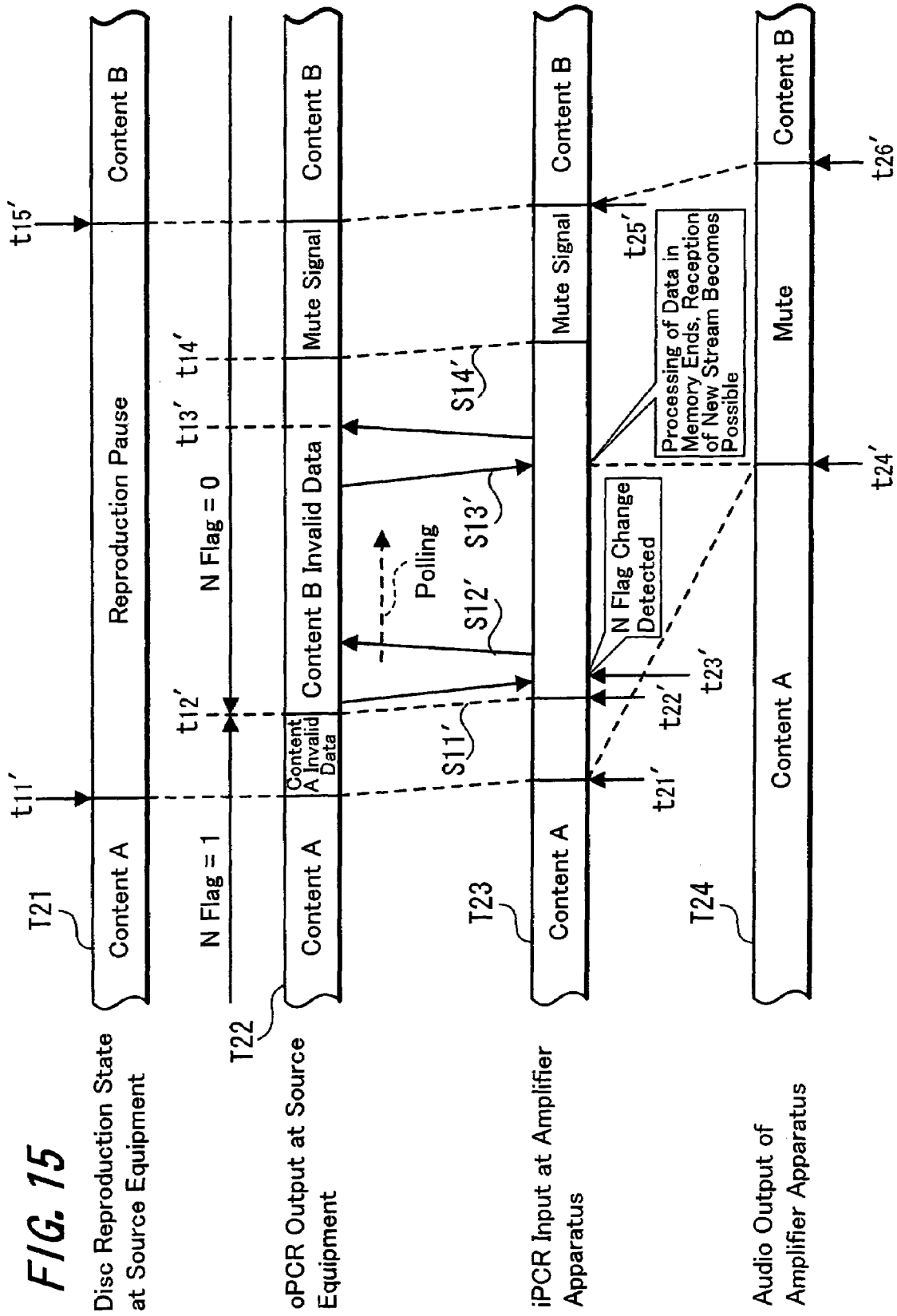
FIG. 15 is an explanatory drawing showing an example of transmission (an example of a change in the N flag) in one aspect of this invention.

Next, an example in which the streaming data N flag changes is explained, referring to FIG. 15. The example of FIG. 13 was an example in which the sampling frequency changed; but changes in the streaming data of transmitted content may also involve changes in the value of the N flag. As already explained, this N flag changes according to whether there is flow control (rate control); for example, the N flag=1 for streaming data the transmission rate of which is being controlled by flow control, and the N flag=0 for streaming data the transmission rate of which is not being controlled by flow control. Here it is supposed that the N flag=1 for content A, and that the N flag=0 for content B. This N flag data is further supposed to be included in the CIP header.

The state T21 of FIG. 15 is a state of disc reproduction of the source equipment; as indicated in this state T21, by reproducing the content A using the disc reproduction apparatus 1, the audio data of the content A is output to the bus line 9 in isochronous transfer mode from the output plug oPCR using a prescribed transmission channel, as shown in state T22 (output plug state in the source equipment); as indicated in state T23 (input plug state in the amplifier apparatus), this audio data is input from the input plug iPCR of the amplifier apparatus 3, and as indicated in state T24 (audio output state of the amplifier apparatus), the audio of content A is output from the speakers connected to the amplifier apparatus 3. The content A is streaming data the transmission rate of which is controlled by flow control, so that in the amplifier apparatus 3, input audio data is temporarily accumulated in a buffer memory before being processed, and so the audio is output from the speakers after a delay equal to the time of accumulation in the buffer memory.

Suppose that reproduction of content A ends at time $t_{11}$. Processing then proceeds to reproduction of content B; at this time, the CPU 110 of the disc reproduction apparatus 1 judges that the streaming data (here, the N flag) of content A and content B is different, and so puts the disc reproduction state in a reproduction paused state. Then, invalid audio data in the format of content A is output, over the channel to which audio data had been output, from the output plug oPCR of the disc reproduction apparatus 1. Here the invalid content A data is data indicated to be ancillary data attached to audio data, and invalid (no-data) audio data. The format of the audio data is the same as the format of content A data.

This invalid audio data in the format of content A is output from the time $t_{11}$' at which reproduction of content A ends for the comparatively short interval (for example, several tens of milliseconds) until time $t_{12}$'. The format of the output audio data is the same format as the audio data of content A, and for this data the N flag=1. As the audio data of this invalid data, for example, audio data with level 0 (no-sound state) is used.

Then at time $t_{12}$', invalid audio data in the format of content B is output from the output plug oPCR of the disc reproduction apparatus 1. Here the invalid data of content B is ancillary data attached to audio data, and invalid audio data (no-data). The audio data is audio data in the second format (and the CIP header is also data in the second format), configured in the same way as the data of content B, and with the N flag=0. As the invalid audio data, for example audio data with level 0 is used.

As the data input from the input plug iPCR of the amplifier apparatus 3, as shown in state T23 of FIG. 15, at time $t_{21}$' the input of content A audio data ends, and from this time $t_{21}$' to $t_{22}$' invalid audio data in the format of content A is input; after time $t_{22}$', invalid audio data in the format of content B is input. When audio data in the format of content B begins to be input, the amplifier apparatus 3 detects, at a time $t_{23}$' somewhat later than the time $t_{22}$' at which input begins, that the N flag has changed to 0 and the transmission rate of the streaming data is being controlled by flow control.

When a state is entered in which invalid audio data in the format of content B is transmitted to the bus line 9, the disc reproduction apparatus 1 which is the source equipment sends an input plug signal format status command in order to investigate the state of an input plug of the input equipment (step S11'). Here the input plug the state of which is being investigated is the input plug verified by the path change subfunction of the input select control command in step S5 of FIG. 12.

The command of this step S11' is, for example, configured as shown in FIG. 14. That is, the data for [INPUT PLUG SIGNAL FORMAT], which is the relevant command, is placed in the [opcode] section, data specifying the plug the state of which is to be investigated is placed in the [operand (0)] section, and the maximum value FF is inserted into the [operand(1)] and subsequent sections. This data is arranged in the packet shown in FIG. 10.

When this command is transmitted from the disc reproduction apparatus 1 to the amplifier apparatus 3 over the bus line 9 as step S11', the amplifier apparatus 3 returns a response to this input plug signal format status command to the disc reproduction apparatus 1 (step S12'). In this response, the command data in the [opcode] and [operand(0)] sections are left unchanged, and the FMT and FDF section data in the CIP header of data being input at that time by the subunit is inserted into the [operand(1)] and subsequent sections.

In the case of this example, at the time when a response is sent in step S12' of FIG. 15, the data of content A is being output, as indicated by the state T24 of FIG. 15; consequently data is returned indicating the state in which streaming data is being input with the transmission rate controlled by flow control, and the disc reproduction apparatus 1 verifies that preparations for input of content B are not yet completed at the amplifier apparatus 3.

Then, while maintaining the current streaming data output (invalid data of content B), the disc reproduction apparatus 1 transmits the input plug signal format status command of step S11' each time a prescribed interval elapses (for example, approximately 200 milliseconds), and repeats this transmission until it can be confirmed through a response that preparations for input of content B have been completed by the amplifier apparatus 3. That is, polling processing is executed until it can be confirmed that preparations for input of content B are completed.

In the example of FIG. 15, as indicated by the state T24 of FIG. 15, when the output of content A audio data accumulated in the buffer memory ends at time $t_{24}$', a switch to processing of data the transmission rate of which is not controlled by flow control is executed, and when the input plug signal format status command is received after this time $t_{24}$' (step S13'), data indicating a state in which streaming data the transmission rate of which is not controlled by flow control can be input is inserted into the response, which is transmitted (step S14').

When the disc reproduction apparatus 1 receives the response of step S14' at time $t_{13}$', after a prescribed interval (for example, several tens of milliseconds) at time $t_{14}$', invalid data in the format of content B output at this time from the disc reproduction apparatus 1 is changed to valid data in the format of content B. However, a mute signal with audio level 0 (no-sound state) is output until time $t_{15}$' after a comparatively short interval (for example, several hundred milliseconds) has elapsed. The streaming data of this mute signal can be discriminated as the format of content B, and enables all internal settings for signal processing to be made in the amplifier apparatus 3; in addition, the data causes muting within the amplifier apparatus 3 and of the audio output, and contains ancillary data attached to the audio data.

Then, at time $t_{15}$' the pause in reproduction of the disc 101 by the disc reproduction apparatus 1 is canceled, as indicated by the state T21 of FIG. 15, reproduction of the audio data recorded as content B is begun, and as indicated in state T22 of FIG. 15, output of content B audio data to the bus line 9 from the output plug is begun.

Content B audio data, transmission of which is begun as described above, is input from time $t_{25}$' by the amplifier apparatus 3, the mute state is canceled at time $t_{26}$' after some time for data processing has elapsed from time $t_{25}$', and content B audio begins to be output from speakers connected to the amplifier apparatus 3.

Thus even when there is a change in streaming data in which the N flag changes, similarly to when the sampling frequency changes, complete data transmission and processing can be performed, without loss of the beginning or other omissions.

In the example shown in FIG. 15, as processing to confirm preparations for input from the disc reproduction apparatus 1 to the amplifier apparatus 3, an input plug signal format status command is sent, and so-called polling processing is performed in which transmission of this command is repeated until it is confirmed by a response that preparations for input of content B are completed; however, the NOTIFY command, which is an AV/C command notifying of state changes, may also be used.

In other words, as step S11', in place of the input plug signal format status command, an input plug signal format notify command is transmitted. On receiving this notify command, the amplifier apparatus 3 immediately returns, in step S12', the state at the time at which this command was received, together with an INTERIM response which is a response acknowledging notification. Then, immediately after time $t_{24}'$ when preparations for receipt of content B are completed, CHANGED data which is a response indicating a changed state is sent. When the disc reproduction apparatus 1 receives this [CHANGED] data, it is judged that preparations for input of content B by the amplifier apparatus 3 are completed.

In the example shown in FIG. 15, when reproduction of content A ends, invalid data in the format of content A is transmitted briefly; however, this invalid data in the format of content A may be omitted, and transmission of invalid data in the format of content B may be begun immediately after the end of reproduction of content A. Similarly, after sending invalid data in the format of content B, a mute signal is transmitted for a prescribed interval, after which transmission of content B data is begun; however, transmission of this mute signal may be omitted.

The examples of FIG. 13 and FIG. 15 explained above are both examples in which the change in streaming data can be detected from the CIP header added to the streaming data; an example in which a change in streaming data cannot be detected from the CIP header is explained below. The latter example is processing which can also be applied to cases in which changes can be detected in the CIP header.

Figure 16:
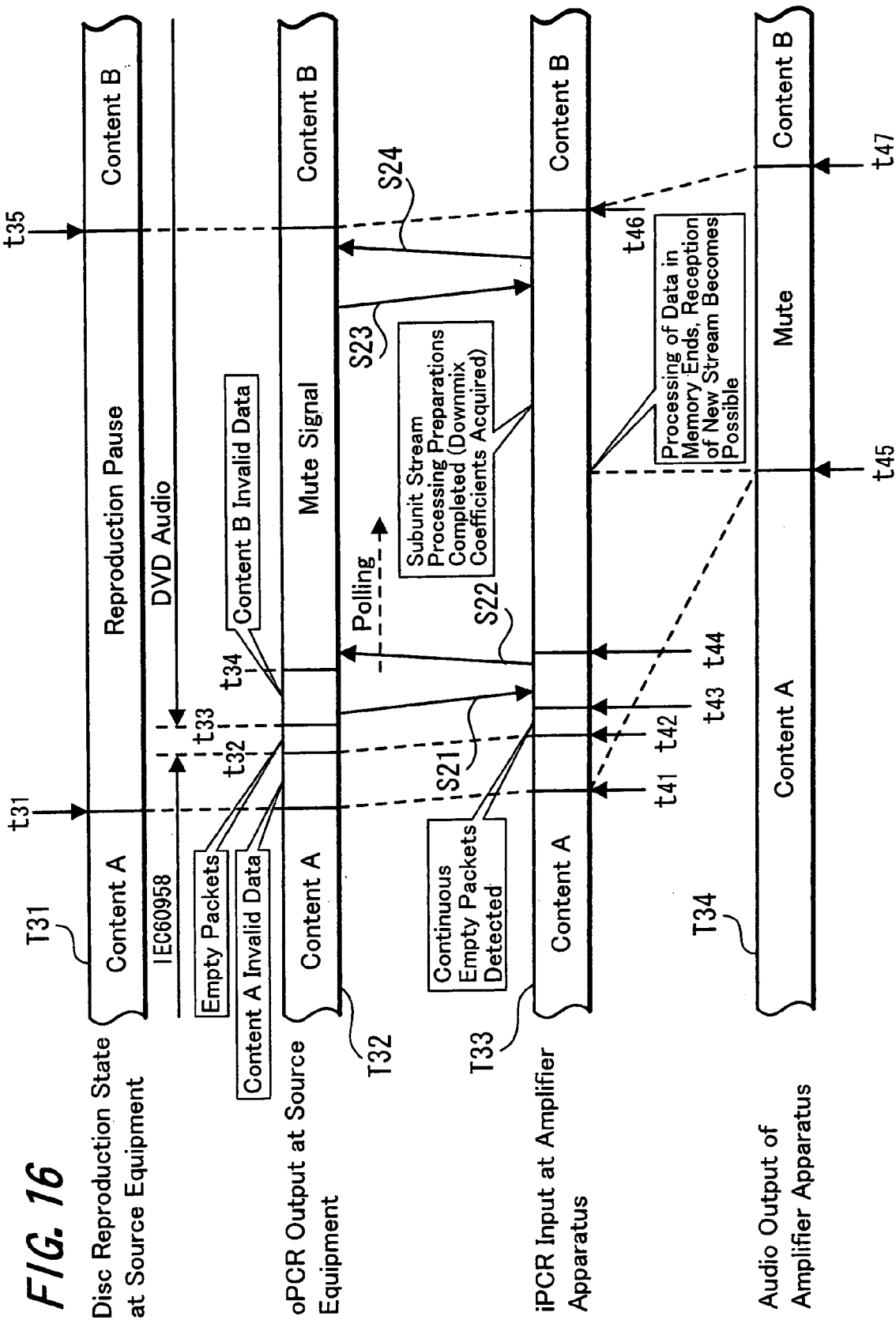
FIG. 16 is an explanatory drawing showing an example of transmission (an example of a format change) in one aspect of this invention; and, FIG. 17 is an explanatory drawing showing an example of transmission (an example of a change in the N flag) in one aspect of this invention.

First, FIG. 16 shows an example of a case in which the signal format changes without a change in the CIP header. In this example, content A is IEC 60958 format audio data, and content B is DVD audio format audio data.

As indicated in state T31 of FIG. 16 (the disc reproduction state of the source equipment), when content A is reproduced by the disc reproduction apparatus 1, the audio data of content A is output to the bus line 9 in isochronous transfer mode from the output plug oPCR using a prescribed transmission channel, as shown by the state T32 in FIG. 16 (state of the output plug of the source equipment); as indicated by state T33 in FIG. 16 (amplifier apparatus input plug state), this audio data is input from the input plug iPCR of the amplifier apparatus 3, and as indicated by state T34 in FIG. 16 (amplifier apparatus audio output state), the audio of content A is output from speakers connected to the amplifier apparatus 3. In the amplifier apparatus 3, the input audio data is temporarily stored in buffer memory before being processed, and so the audio is output from the speakers after a delay equal to the time during which the data is accumulated in the buffer memory.

Suppose that reproduction of content A ends at time $t_{31}$. Reproduction of content B is then begun; but at this time, the CPU 110 of the disc reproduction apparatus 1 judges that the formats of content A and of content B differ, and the disc reproduction state is put into a reproduction pause state. Then invalid audio data in the format of content A is output from the output plug oPCR of the disc reproduction apparatus 1 to the channel to which audio data had been output. This content A invalid data is data which is indicated to be ancillary data attached to audio data, and invalid audio data (no-data). The format of the audio data is the same format as the data of the content A.

This invalid audio data in the format of content A is output to the bus line 9 until time $t_{32}$, a comparatively short time (for example, several tens of milliseconds) after the time $t_{31}$ at which reproduction of content A ends. Until this time, the format of output audio data has been the same format as the audio data of content A, that is, IEC 60958 format audio data. As this invalid audio data, for example, audio data with level 0 is used.

Then, at time $t_{32}$, a packet without actual data, called an empty packet, is transmitted using an isochronous packet for streaming data transfer. Transmission of this empty packet is performed over an interval of, for example, 1 ms or greater. Thereafter, at time $t_{33}$ invalid audio data in the format of content B (that is, the DVD audio format) is output from the output plug oPCR of the disc reproduction apparatus 1. This content B invalid data is data which is indicated to be ancillary data attached to audio data, and invalid audio data (no-data). As this invalid audio data also, for example, audio data with level 0 is used. After invalid content B data is transmitted for a prescribed interval from time $t_{33}$, at time $t_{34}$ a mute signal with the format of content B is transmitted. Here, the streaming data of the mute signal can be discriminated as the content B format, and all internal settings for signal processing can be made by the amplifier apparatus 3, while in addition the data mutes the amplifier apparatus 3 and the output audio, and includes ancillary data attached to the audio data.

As data input from the input plug iPCR of the amplifier apparatus 3, as indicated by state T33 in FIG. 16, when content A audio data input ends at time $t_{41}$ invalid audio data in the format of content A is input from time $t_{41}$ until time $t_{42}$, and from time $t_{42}$ until time $t_{43}$ empty packets are input. After time $t_{43}$, invalid audio data in the format of content B is input. When audio data in the format of content B begins to be input, the change in data format of the input streaming data (which however is invalid data) itself is directly detected within the amplifier apparatus 3. Here, data in the changed format is transmitted after transmission of empty packets with no actual data, so that the change in format can be detected in a comparatively short time.

When invalid audio data in the format of content B is transmitted to the bus line 9, the disc reproduction apparatus 1 which is the source equipment sends a signal source status AV/C command in order to investigate the state of the input equipment (step S21).

After transmitting this command, the disc reproduction apparatus 1 verifies a response to this command (step S22). By verifying this response, the state of the amplifier apparatus 3 is verified, and it is judged whether the amplifier apparatus 3 is currently in a state enabling acceptance of input data and has completed preparations for data processing.

In the case of this example, when a response is sent in step S22 of FIG. 16, data of content A is still being output, as indicated by state T34 of FIG. 16; hence the disc reproduction apparatus 1 confirms that preparations for input and processing of content B by the amplifier apparatus 3 are not completed.

Then, while maintaining the current streaming data output (DVD audio mute signal), the disc reproduction apparatus 1 transmits the command of step S21 each time a prescribed interval elapses (for example, approximately 200 milliseconds), and repeats this transmission until it can be confirmed through a response that preparations for input and processing of content B have been completed by the amplifier apparatus 3. That is, repeated transmission of commands and responses is performed through polling processing until it can be confirmed that preparations for input of content B are completed.

In the example of FIG. 16, as indicated by state T34 in FIG. 16, it is possible to end output of content A audio data accumulated in buffer memory at time $t_{45}$ and to switch the internal circuitry of the amplifier apparatus and similar so as to enable processing of content B audio data; for example, downmix coefficients for DVD audio are acquired, and the acquired coefficients are set. After switching to processing of the content B audio data is performed, when the signal source status command of step S23 is received, the fact that preparations for input and processing of content B audio data are completed is transmitted in the response (step S24), and this is verified by the disc reproduction apparatus 1.

When the disc reproduction apparatus 1 receives the response of step S24, immediately afterward at time $t_{35}$ the mute signal which is at that time being output from the disc reproduction apparatus 1 is halted, and as indicated in state T31 of FIG. 16, the pause in reproduction of the disc 101 at the disc reproduction apparatus 1 is canceled and reproduction of the audio data recorded as content B is begun; and as indicated in state T32 of FIG. 16, output of content B audio data to the bus line 9 from an output plug is begun.

Content B audio data, transmission of which is begun in this way, is input to the amplifier apparatus 3 beginning from time $t_{46}$, and at a time $t_{47}$ later somewhat than time $t_{46}$ due to time required for buffer memory accumulation and data processing, the mute state is canceled and content B audio is output from the speakers connected to the amplifier apparatus 3.

Thus even when the format changes but there is no change in the header of audio data transmitted in this way, loss of the beginning of content and other omissions are avoided, and complete data transmission and processing can be performed.

In the example of FIG. 16 also, a NOTIFY command may be used in place of a status command to provide notification of a state change in order to confirm preparations for input from the disc reproduction apparatus 1 to the amplifier apparatus 3.

Also, in the example of FIG. 16 invalid data in the format of content A is transmitted briefly when reproduction of content A ends; however, invalid data in the format of content A may be omitted, and transmission of empty packets begun immediately after the end of reproduction of content A. Similarly, invalid data in the format of content B may be omitted.

Next, as an example in which a signal source status command is used with the CIP header changed, an example of a case in which the N flag changes is explained referring to FIG. 17. It is supposed that the change cannot be detected. In this example, it is supposed that content A has an N flag=1, and content B has an N flag=0.

As indicated in state T41 of FIG. 17 (disc reproduction state in the source equipment), when the disc reproduction apparatus 1 reproduces content A, the content A audio data is output from the output plug oPCR to the bus line 9 in isochronous transfer mode using a prescribed transmission channel, as shown by state T42 in FIG. 17 (source equipment output plug state); and as indicated by state T43 in FIG. 17 (amplifier apparatus input plug state), audio data from the input plug iPCR of the amplifier apparatus 3 is input, and content A audio is output from speakers connected to the amplifier apparatus 3, as indicated in state T44 of FIG. 17 (amplifier apparatus audio output state). Content A is streaming data the transmission rate of which is controlled by rate control, and so in the amplifier apparatus 3 the input audio data is temporarily accumulated in buffer memory before processing, and the audio is therefore output from the speakers after a delay equal to the time of accumulation in the buffer memory.

Suppose that reproduction of content A ends at time $t_{31}'$. At this time, reproduction of content B then begins, and at this time, the CPU 110 of the disc reproduction apparatus 1 judges that the flag is different for content A and for content B and puts the disc reproduction state into a reproduction paused state. Then, invalid audio data in the format of content A is output from the output plug oPCR of the disc reproduction apparatus 1 using the channel to which audio data had been output. Here, content A invalid data is data which is indicated to be ancillary data attached to audio data, and invalid audio data (no-data). The format of the audio data is the same format as the data of the content A.

This invalid audio data in the format of content A is output to the bus line 9 from the time $t_{31}'$ at which reproduction of content A ends, for the comparatively short interval (for example, several hundred milliseconds) until time $t_{32}'$. Until this time, the format of the output audio data is the same format as the audio data of content A, and is data for which the N flag=1. As this invalid audio data, for example, audio data with level 0 is used.

Then, at time $t_{32}'$, a PACKET without actual data, called an empty packet, is transmitted using an isochronous packet for streaming data transfer. Transmission of this empty packet is performed over an interval of, for example, 1 ms or greater. Thereafter, at time $t_{33}'$ invalid audio data in the format of content B is output from the output plug oPCR of the disc reproduction apparatus 1. This content B invalid data is data which is indicated to be ancillary data attached to audio data, and invalid audio data (no-data). As this invalid audio data, for example, audio data with level 0 is used. After invalid content B data is transmitted for a prescribed interval from time $t_{33}'$, at time $t_{34}'$ a mute signal with the format of content B is transmitted. Here, the streaming data of the mute signal can be discriminated as the content B format, and all internal settings for signal processing can be made by the amplifier apparatus 3, while in addition the data mutes the amplifier apparatus 3 and the output audio, and includes ancillary data attached to the audio data.

As data input from the input plug iPCR of the amplifier apparatus 3, as indicated by state T43 in FIG. 17, when content A audio data input ends at time $t_{41}'$ invalid audio data in the format of content A is input from time $t_{41}'$ until time $t_{42}'$, and from time $t_{42}'$ until time $t_{43}'$ empty packets are input. After time $t_{43}'$, invalid audio data in the format of content B is input. When audio data in the format of content B begins to be input, the change in data format of the input streaming data (which however is invalid data) itself is directly detected within the amplifier apparatus 3 from the fact that the N flag in the CIP header is changed to 0, and that the streaming data transmission rate is no longer controlled by flow control. Here, data in the changed format is transmitted after transmission of empty packets with no actual data, so that the change in format can be detected in a comparatively short time.

When invalid audio data in the format of content B is transmitted to the bus line 9, the disc reproduction apparatus 1 which is the source equipment sends a signal source status AV/C command in order to investigate the state of the input equipment (step S21).

After transmitting this command, the disc reproduction apparatus 1 verifies a response to this command (step S22). By verifying this response, the state of the amplifier apparatus 3 is verified, and it is judged whether the amplifier apparatus 3 is currently in a state enabling acceptance of input data and has completed preparations for data processing.

In the case of this example, when a response is sent in step S22 of FIG. 17, data of content A is still being output, as indicated by state T44 of FIG. 17; hence the disc reproduction apparatus 1 confirms that preparations for input and processing of content B by the amplifier apparatus 3 are not completed.

Then, while maintaining the current streaming data output (mute signal), the disc reproduction apparatus 1 transmits the command of step S21 each time a prescribed interval elapses (for example, approximately 200 milliseconds), and repeats this transmission until it can be confirmed through a response that preparations for input and processing of content B have been completed by the amplifier apparatus 3. That is, repeated transmission of commands and responses is performed through polling processing until it can be confirmed that preparations for input of content B are completed.

In the example of FIG. 17, as indicated by state T44 in FIG. 17, it is possible to end output of content A audio data accumulated in buffer memory at time $t_{45}{'}$ and to switch the internal circuitry of the amplifier apparatus and similar so as to enable processing of content B audio data; for example, downmix coefficients for content B are acquired, and the acquired coefficients are set. After switching to processing of the content B audio data is performed, when the signal source status command of step S23 is received, the fact that preparations for input and processing of content B audio data, the transmission rate of which is not controlled by flow control, are completed is transmitted in the response (step S24), and this is verified by the disc reproduction apparatus 1.

When the disc reproduction apparatus 1 receives the response of step S24, immediately afterward at time $t_{35}{'}$ the mute signal which is at that time being output from the disc reproduction apparatus 1 is halted, and as indicated in state T41 of FIG. 17, the pause in reproduction of the disc 101 at the disc reproduction apparatus 1 is canceled and reproduction of the audio data recorded as content B is begun; and as indicated in state T42 of FIG. 17, output of content B audio data to the bus line 9 from an output plug is begun.

Content B audio data, transmission of which is begun in this way, is input to the amplifier apparatus 3 beginning from time $t_{46}{'}$, and at a time $t_{47}{'}$ later somewhat than time $t_{46}{'}$ due to time required for buffer memory accumulation and data processing, the mute state is canceled and content B audio is output from the speakers connected to the amplifier apparatus 3.

Thus even when there is a change in the N flag or other parts of the CIP header, loss of the beginning of content and other omissions are avoided, and complete data transmission and processing can be performed.

In the example of FIG. 17 also, a NOTIFY may be used in place of a status command to provide notification of a state change in order to confirm preparations for input from the disc reproduction apparatus 1 to the amplifier apparatus 3.

Also, in the case of the example of FIG. 17 also, the invalid data in the format of content A may be omitted, and transmission of empty packets begun immediately after the end of reproduction of content A. Similarly, invalid data in the format of content B may be omitted.

In the above-described aspect, an example was explained in which the transmitted streaming data is audio data, but application to cases in which other types of streaming data is transmitted is also possible. For example, application is also possible in cases where the transmitted streaming data is video data.

In the above-described case of audio data, when the format of the transmitted data changes, invalid data which causes the audio output to be muted is transmitted; in the case of video data, for example, invalid data is transmitted which causes the display resulting from video data input by the input equipment to be erased, and the video display by the display means comprised by the input equipment (for example, display means connected to the input equipment) may be put into a temporary non-display state when there is a change in format.

In the above-described aspect, the input equipment prepares for input of content B, which is the data after the change, after first ending processing of content A which is the data prior to the change; however, a method may be used in which, in the case of input equipment which completes preparation for input of content B during processing of content A, the completion of preparations for input during processing of content A can be detected by the output equipment.

Further, equipment application of which as source equipment, input equipment, and controller is possible is not limited to the equipment described in the above aspect, but application is possible to various types of equipment which can be connected to a network.

In the above-described aspect, the case of a network configured using an IEEE 1394 bus was explained; however, application to cases in which similar data is transmitted between equipment over other networks is also possible. In this case, a network which performs data transmission may be used. As one network which performs wireless transmission, for example, application to Bluetooth (a trademark) is possible.

Also, the network (transmission path) over which streaming data is transmitted, and the network (transmission path) used to investigate the state of the input equipment, may be separate. For example, a network configured using an IEEE 1394 bus may be employed as the network for transmission of streaming data, and a network which performs control by wireless transmission may be used for transmission of commands and responses to investigate the state of the input equipment.

In the above-described aspect, functions to perform the above-described processing are set in the respective equipment units; however, a program to execute similar processing may be distributed to users employing some kind of media, with users made to deploy the program stored on the media on a computer or similar connected to an IEEE 1394 network in order to execute similar functions. As the media used, in addition to optical discs, magnetic disks and other physical recording media, media provided to users via the Internet or other communication means may also be employed.

INDUSTRIAL APPLICABILITY

By means of this invention, when source equipment detects the fact that settings internal to equipment which inputs streaming data via a bus have switched to enable reception of streaming data in a different format, the output of actual streaming data from the source equipment is begun, so that the input equipment can correctly process the streaming data in the changed format from the beginning, and the received audio data or other streaming data can be processed satisfactorily and without omissions.

The invention claimed is:

1. A communication method for transmitting streaming data, the communication method comprising:
passing the streaming data output from first equipment through a prescribed network to second equipment;

when the streaming data output from said first equipment changes from streaming data in a first format to streaming data in a second format, detecting by said first equipment an end of output of streaming data in said first format;

when the end of output of streaming data in said first format is detected:
- entering by said first equipment a reproduction pause state;
- outputting by said first equipment invalid ancillary data in the second format;
- during the output of the invalid ancillary data in the second format:
  - detecting by said second equipment the change in the streaming data from the first format to the second format;
  - outputting by said first equipment a mute signal in the second format to enable the second equipment to perform preparations for processing of streaming data in the second format;
  - investigating by said first equipment a state of said second equipment; and
  - determining by said first equipment that preparations of the second equipment for processing of streaming data in the second format are completed;

when the preparations of the second equipment for processing of streaming data in the second format are completed:
- canceling by said first equipment the mute signal;
- canceling by said first equipment the reproduction pause state; and
- initiating output of streaming data in said second format from the first equipment through the network to the second equipment.

2. The communication method according to claim 1, wherein, in order to investigate the state of said second equipment, said first equipment sends a specific packet to said second equipment over said network, and based on a response to said specific packet, said first equipment confirms the state of said second equipment.

3. The communication method according to claim 2, wherein said specific packet comprises data to query whether or not a current state of said second equipment is a state enabling input of streaming data in said second format, and, said specific packet is repeatedly transmitted until a state enabling input of streaming data in said second format is confirmed, based on the response to said packet.

4. The communication method according to claim 2, wherein said specific packet comprises data to cause notification that said second equipment has changed to a state enabling input of streaming data in said second format, and the fact of a change to a state in which streaming data in said second format can be input is confirmed based on a response to said packet.

5. The communication method according to claim 1, wherein the mute signal causes audio output at said second equipment to be muted.

6. The communication method according to claim 1, wherein detecting by said first equipment the end of output of streaming data in said first format comprises outputting invalid ancillary data in the first format.

7. The communication method according to claim 1, wherein the streaming data in the first format comprises streaming data of a first sampling frequency and the streaming data in the second format comprises streaming data of a second sampling frequency, and wherein the first sampling frequency is different from the second sampling frequency.

8. The communication method according to claim 1, wherein the streaming data in the first format comprises streaming data transmission rate of which is controlled by flow control and the streaming data in the second format comprises streaming data transmission rate of which is not controlled by the flow control.

9. The communication method according to claim 1, wherein the streaming data in the first format comprises streaming data of a first audio standard and the streaming data in the second format comprises streaming data of a second audio standard.

10. A communication system to output streaming data from output equipment and to receive the streaming data by input equipment over a prescribed network, wherein said output equipment comprises:
- output equipment communication means to perform communication over said network;
- streaming data acquisition means to acquire streaming data output from said output equipment communication means;
- format detection means, which detects changes in a format of said output streaming data; and
- output equipment control mean which:
  - controls output of the output streaming data from said output equipment communication means,
  - executes control such that invalid ancillary data is output from said output equipment communication means in a second format when the output streaming data changes from a first format to the second format,
  - executes control such that the output equipment is put in a reproduction pause state;
  - during the output of the invalid ancillary data in the second format:
    - outputs a mute signal in the second format to enable the input equipment to perform preparations for processing of streaming data in the second format;
    - investigates a state of said input equipment through said output equipment communication means, and
    - determines that preparations of said input equipment for processing of streaming data in said second format have been completed;
  - when the preparations of the input equipment for processing of streaming data in the second format are completed:
    - cancels the mute signal,
    - cancels the reproduction pause state, and
    - begins output of streaming data in said second format from said output equipment communication means over the prescribed network to the input equipment; and wherein said input equipment comprises:
- input equipment communication means to perform communication over said network;
- format discrimination means to discriminate the format of streaming data received by said input equipment communication means;
- streaming data processing means to process streaming data received by said input equipment communication means; and
- input equipment control means to:
  - during input of said invalid ancillary data in the second format, detect the change in the output streaming data from the first format to the second format; and
  - set processing of streaming data by said streaming data processing means to processing compatible with the format of data received by said input equipment communication means, based on a discrimination result of said format discrimination means.

11. The communication system according to claim 10, wherein, in order to investigate the state of said input equipment, said output equipment control means transmits a specific packet from said output equipment communication means to said input equipment, and, when said output equipment communication means receives response data as a response to said transmitted packet, confirms the state of said input equipment based on the received response data; and, when said input equipment communication means receives said specific packet, said input equipment control means transmits data relating to the settings in said streaming data processing means as response data from said input equipment communication means.

12. The communication system according to claim 11, wherein said output equipment control means appends data to the specific packet output from said output equipment communication means, querying whether the state of said input equipment enables input of streaming data in said second format; and, said input equipment control means appends, to the response output from said input equipment communication means, data enabling distinction of whether preparations for input of streaming data in said second format are completed.

13. The communication system according to claim 10, wherein the mute signal output from said output equipment communication means is data which causes audio output to be muted by the streaming data processing means of said input equipment.

14. Output equipment which outputs streaming data to input equipment via a prescribed network, the output equipment comprising:
communication means to perform communication over said network;
streaming data input means for input of streaming data output from said communication means;
format detection means to detect changes in a format of streaming data output from said communication means; and
control means which:
controls output of the output streaming data from said communication means,
when said format detection means detects a change in a format of the output streaming data from a first format to a second format:
executes control such that the output equipment is put in a reproduction pause state;
causes invalid ancillary data to be output from said communication means in the second format;
during the output of the invalid ancillary data in the second format:
outputs a mute signal in the second format to enable the input equipment to perform preparations for processing of streaming data in the second format,
investigates a state of said input equipment through the communication means,
determines that preparations of the input equipment for processing of streaming data in said second format have been completed;
when the preparations of the input equipment for processing of streaming data in the second format are completed:
cancels the mute signal,
cancels the reproduction pause state, and
initiates output of streaming data in said second format from said communication means via the prescribed network to the input equipment.

15. The output equipment according to claim 14, wherein said control means, in order to investigate a state of said input equipment, executes control so as to transmit a specific packet from said communication means to said input equipment, and, when a response to said transmitted packet is received by said communication means, discriminates the state of said input equipment from data contained in the response.

16. The output equipment according to claim 15, wherein said control means appends, to the specific packet output from said communication means, query data which queries whether the state of said input equipment is such that streaming data in said second format can be input, and executes control such that said specific packet is repeatedly transmitted until it is confirmed, based on a response to a packet to which said query data is appended, that said input equipment is in a state in which streaming data in said second format can be input.

17. The output equipment according to claim 14, wherein the mute signal output from said communication means is data which causes audio output to be muted at said input equipment.

* * * * *